United States Patent
Yamanashi

[11] Patent Number: 5,835,286
[45] Date of Patent: Nov. 10, 1998

[54] STANDARD LENS SYSTEM HAVING A LARGE APERTURE RATIO

[75] Inventor: Takanori Yamanashi, Tokyo, Japan

[73] Assignee: Olympus Optical Co., Ltd., Tokyo, Japan

[21] Appl. No.: 701,882

[22] Filed: Aug. 23, 1996

[30] Foreign Application Priority Data

Aug. 25, 1995 [JP] Japan .................................. 7-238939
Aug. 29, 1995 [JP] Japan .................................. 7-242310

[51] Int. Cl.$^6$ .............................. G02B 9/64; G02B 9/14; G02B 9/12
[52] U.S. Cl. .......................... 359/755; 359/784; 359/786; 359/787; 359/788; 359/791
[58] Field of Search ...................... 359/689, 716, 359/739, 740, 748, 750, 751, 753, 754, 755, 759, 760, 784, 786, 787, 788, 789, 791, 796, 797

[56] References Cited

U.S. PATENT DOCUMENTS

| | | | |
|---|---|---|---|
| 3,802,765 | 4/1974 | Vuijk | 350/215 |
| 4,235,519 | 11/1980 | Fujibayashi | 359/750 |
| 4,464,023 | 8/1984 | Kato et al. | 359/755 |
| 4,786,153 | 11/1988 | Ogata | 359/755 |
| 4,807,983 | 2/1989 | Matsushita | 359/755 |
| 4,826,301 | 5/1989 | Ikemori | 359/791 |
| 4,986,643 | 1/1991 | Moriyama | 359/791 |
| 5,007,720 | 4/1991 | Hamanishi | 359/791 |
| 5,257,135 | 10/1993 | Kohno et al. | 359/689 |
| 5,299,065 | 3/1994 | Watanabe | 359/759 |
| 5,592,334 | 1/1997 | Oshikiri et al. | 359/689 |

FOREIGN PATENT DOCUMENTS

| | | |
|---|---|---|
| 1 275 302 | 8/1968 | Germany . |
| 1 286 776 | 1/1969 | Germany . |
| 1 299 129 | 7/1969 | Germany . |
| 39-022079 | 10/1939 | Japan . |
| 45-14839 | 5/1970 | Japan . |

*Primary Examiner*—Frank G. Font
*Assistant Examiner*—Michael P. Stafira
*Attorney, Agent, or Firm*—Cushman Darby & Cushman IP Group of Pillsbury Madison & Sutro LLP

[57] ABSTRACT

A standard lens system composed, in order from the object side, of a first lens unit having a positive refractive power, an aperture stop, a second lens unit having a positive refractive power and a third lens unit having a negative refractive power: the first lens unit being composed of at least one positive meniscus lens component which has a convex surface on the object side, and at least one doublet which consists of a positive meniscus lens component and a negative lens component; the second lens unit being composed of at least one cemented doublet which consists of a negative lens element and a positive lens element, and a positive lens component; and the third lens unit being composed of at least one positive lens component and a negative lens component or at least one negative lens component.

9 Claims, 10 Drawing Sheets

STANDARD LENS SYSTEM HAVING A LARGE APERTURE RATIO

BACKGROUND OF THE INVENTION a) Field of the Invention

The present invention relates to a standard lens system which has high depicting performance and a high aperture ratio.

b) Description of the Prior Art

Out of the so-called standard lens systems having field angles on the order of 46°, imaging lens systems for single-lens reflex cameras select a modified Gauss type which is asymmetrical from a viewpoint of refractive power arrangement for reserving back focal lengths required for disposing and moving mirrors. However, the lens systems which have such asymmetrical refractive power arrangements result in aggravation of aberrations. Lateral chromatic aberration, curvature of field and sagittal coma, in particular, are apt to be remarkable as aperture ratios are enhanced. Further, attempts to correct coma by enhancing refractive indices of glass materials are limited, and pose problems of chromatic aberration and curvature of field.

Though the restrictions imposed on back focal lengths are rather loose for cameras and similar optical instruments which use rangefinders, on the other hand, most of these instruments actually adopt Gauss type lens systems having larger numbers of cemented surfaces.

Furthermore, U.S. Patent Publication No. 5299065 discloses a lens system for noctovisions which has a field angle of 40° and an aperture ratio of 1:1.2. However, this lens system has an asymmetrical composition and produces distortion in an extremely large amount. Moreover, German Patent Publication No. 1286776 discloses a lens system also for noctovisions comprising a meniscus lens element which is disposed on the image side and has a concave surface on the image side. These lens systems must have large apertures to compensate for insufficient light quantities and are usable only within limited wavelength regions.

In addition, lens systems disclosed by Japanese Patents Publication No. Sho 39-22079 and Sho 45-14839 are copying lens systems which are to be used for photographing objects located at finite distances at specific magnifications and different from general photographic lens systems.

SUMMARY OF THE INVENTION

A primary object of the present invention is to provide a standard lens system which is to be used as a general photographic lens system or an optical system for electronic video appliances which use rays over the entire visible region, improved in correction of sagittal coma and curvature of field even when it has a high aperture ratio, and excellent in its depicting performance thereof.

The standard lens system according to the present invention is characterized in that it is composed of three basic lens units, in order from the object side, a first lens unit having a positive refractive power, an aperture stop, a second lens unit having a positive refractive power and a third lens unit having a negative refractive power; the first lens unit being composed of at least one positive meniscus lens component having a convex surface on the object side, and at least one doublet consisting of a positive meniscus lens component and a negative lens component; the second lens unit being composed of at least one cemented doublet consisting of a negative lens element and a positive lens element, and a positive lens component; and the third lens unit being composed of at least one positive lens component and a negative lens component and is configured so as to satisfy the following conditions (1) through (4) at the same time:

(1) $2.0 < f_1/f < 10$
(2) $1.0 < f_1/f_2 < 8$
(3) $0.8 < \beta_3 < 1.3$
(4) $0.1 < f_b/f < 0.5$ wherein the reference symbol $f_1$ represents a focal length of the first lens unit, the reference symbol $f_2$ designates a focal length of the second lens unit, the reference symbol $f$ denotes a focal length of the standard lens system as a whole, the reference symbol $\beta_3$ represents an imaging magnification of the third lens unit for infinite object distance and the reference symbol $f_b$ designates a back focal length of the standard lens system as a whole.

Further, a second standard lens system according to the present invention is characterized in that it is composed, in order from the object side, of a first lens unit having a positive refractive power, an aperture stop, a second lens unit having a positive refractive power and a third lens unit having a negative refractive power; the first lens unit being composed of at least one positive meniscus lens component having a convex surface on the object side, and at least one doublet consisting of a positive lens component and a negative lens component; the second lens unit being composed of at least one cemented doublet consisting of a negative lens element and a positive lens element, and a positive lens component; and the third lens unit being composed of at least one negative lens component the second standard lens system has at least one aspherical surface disposed in any one of the lens units, and is configured so as to satisfy the following conditions (5) through (8) at the same time:

(5) $0.5 < f_2/f < 10$
(6) $1.0 < f_1/f_2 < 15$
(7) $0.8 < \beta_3 < 1.3$
(8) $0.05 < f_b/f < 0.5$ wherein the reference symbol $f_1$ represents a focal length of the first lens unit, the reference symbol $f_2$ designates a focal length of the second lens unit, the reference symbol $f$ denotes a focal length of the standard lens system as a whole, the reference symbol $\beta_3$ represents an imaging magnification of the third lens unit for infinite object distance and the reference symbol $f_b$ designates a back focal length of the standard lens system as a whole.

DETAILED DESCRIPTION OF THE PREFERRED EMBODIMENTS

Figure 1:
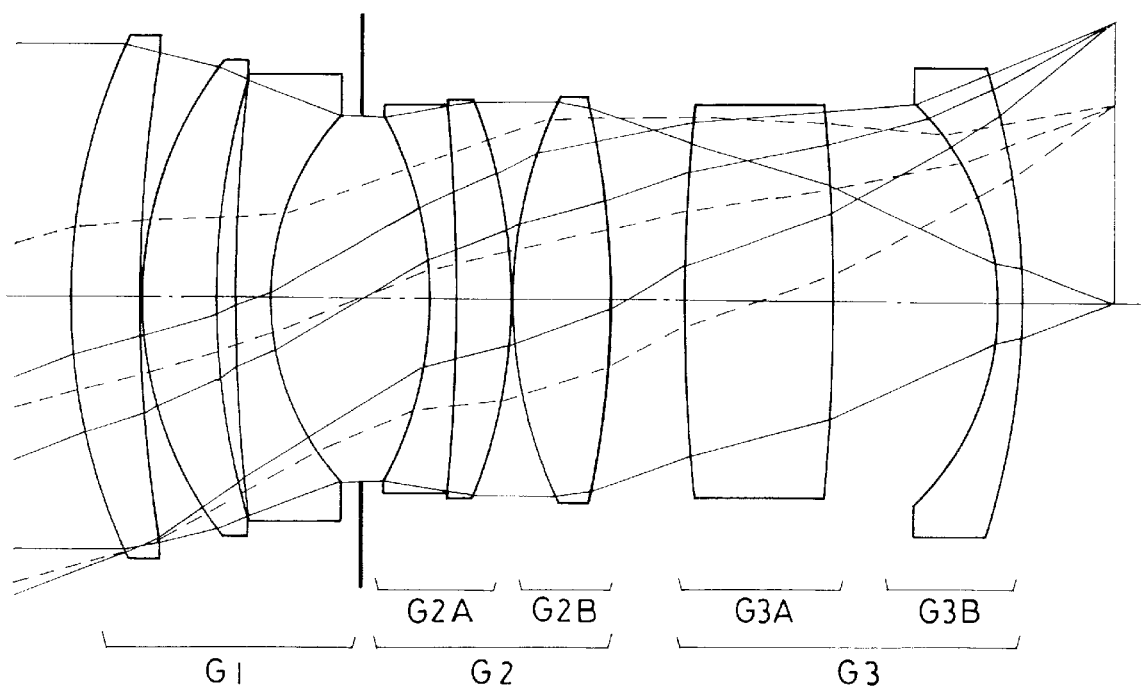
FIG. 1 shows a sectional view illustrating a condition of a light bundle in a lens system preferred as a first embodiment of the standard lens system according to the present invention.

The lens system according to the present invention has a composition wherein a lens unit which has a relatively weak refractive power, and comprises a positive lens component and a negative lens component or a negative lens component is disposed after a modified Gauss type converging lens system comprising an aperture stop. The lens system according to the present invention which has the composition described above not only eliminates the restrictions imposed on back focal lengths of the conventional lens systems but also is configured to improve optical performance thereof by utilizing a section which is originally an airspace for flattening an offaxial image surface, whereby the lens system adopts a unique optical arrangement which has conventionally not been realized in lens systems for use in the visible region.

Large apertures are generally demanded for the so-called standard lens systems, or lens systems which have field angles within a range on the order of 40° to 52°. For this reason, the modified Gauss type which has field-proven achievements is desirable since it allows lens systems to be composed reasonably from a viewpoint of passages for light bundles. In a lens system of the Gauss type which has a symmetrical basic composition, however, a principal point is located in the vicinity of an aperture stop disposed in the middle of the lens system and, when the lens system is used in a single-lens reflex camera, a refractive power arrangement is asymmetrical in an optical system, whereby the optical system has unsatisfiable performance in a condition where the aperture stop is open.

On a hypothesis of loose restrictions imposed on a back focal length, the lens system according to the present invention is configured so as to have a symmetrical refractive power arrangement. On the other hand, photographic lens systems which must favorably correct aberrations within a range from infinite object distance to a finite object distance cannot have strictly symmetrical refractive power arrangement, but can correct lateral chromatic aberration and distortion extremely easily. In contrast, the conventional standard lens systems produce relatively remarkable curvature of field. The present invention aims to correct curvature of field.

For the reasons described above, the lens system according to the present invention is configured as a standard lens system which is characterized in that it is composed, as described above, of the three basic lens units, in order from the object side, of the first lens unit having the positive refractive power, the aperture stop, the second lens unit having the positive refractive power and the third lens unit having the negative refractive power; the first lens unit being composed of at least one positive meniscus lens component having the convex surface on the object side, and at least one doublet consisting of the positive meniscus lens component and the negative lens component; the second lens unit being composed of at least one cemented doublet consisting of the negative lens element and the positive lens element, and the positive lens component; and the third lens unit being composed of at least one positive lens component and the negative lens component; and that it is configured so as to satisfy the conditions (1) through (4) at the same time.

For a lens system having the composition described above, it is natural that the first lens unit and the second lens unit disposed on both the sides of the aperture stop have positive refractive powers since they are originally converging lens systems, and it is apparent from the optical principle that the symmetrical refractive power arrangement is desirable for making use of the symmetrical composition or correcting aberrations. For maintaining flatness of an offaxial image surface, or correction of curvature of field, and also for configuring the lens system compactly, it is desirable to configure the third lens unit so as to have a weak negative refractive power. From viewpoints described above, the lens system according to the present invention is composed, in order from the object side, of the first lens unit having the positive refractive power, the second lens unit having a positive refractive power and the third lens unit having the negative refractive power; and the first lens unit and the second lens unit are composed nearly symmetrically for correcting curvature of field.

The condition (1) defines a refractive power of the first lens unit. This condition is important for arranging refractive powers nearly symmetrically in the first lens unit differently from the refractive power arrangement selected for the conventional lens systems for single-lens reflex cameras.

If the lower limit of 2.0 or the condition (1) is not reached, the first lens unit will have a strong refractive power which is preferable for configuring the lens system compactly, but makes it difficult to correct curvature of field and coma. Such a string refractive power of the first lens unit may be advantageous for correcting aberrations at a specific finite object distance, but is not always desirable for a certain range of photographing distances wherein the lens system is to be used. If the first lens unit has a refractive power exceeding the upper limit of 10 of the condition (1), it will be advantageous for correcting aberrations but undesirably enlarge the lens system. Further, such a strong refractive power of the first lens unit will degrade the symmetry defined by the condition (2), thereby making the refractive power arrangement close to those selected for the lens systems for single-lens reflex cameras or making the refractive power arrangement remarkably asymmetrical.

The condition (2) defines a ratio between focal lengths of the first lens unit having the positive refractive power and the second lens unit having the positive refractive power. The ratio expresses a factor of symmetry and is used for determining a refractive power of the second lens unit after a refractive power of the first lens unit has been selected.

If the lower limit of 1.0 of the condition (2) is not reached, the refractive powers will be highly symmetrical with regard to the aperture stop, but aberrations cannot be adequately corrected at object distances in the vicinities of infinite distance. This means that a completely symmetrical refractive power arrangement is not always desirable for a lens which is to be used, like a photographic lens system, while being focused on objects within a wide range of distances. If the upper limit of 8 of the condition (2) is exceeded, the refractive power arrangement will be remarkably asymmetrical, thereby allowing coma, astigmatism and lateral chromatic aberration to remain in large amounts.

The condition (3) defines an imaging magnification of the third lens unit. If the imaging magnification is below the lower limit of 0.8 of the condition (3), it will be advantageous for correcting aberrations, but the lens system will be large when it has a high aperture ratio, thereby making it impossible to obtain a desirable result. If the upper limit of 1.3 of the condition (3) is exceeded, the first lens unit and the second lens unit will have a long total focal length, thereby making it difficult to correct aberrations, and longitudinal aberrations may be varied in proportion to a square of the magnification $\beta_3$, thereby making it difficult to balance a high aperture ratio with compactness of the lens system.

The condition (4) defines a range wherein the lens system according to the present invention is to be used directly in terms of a back focal length. If the upper limit of 0.5 of the condition (4) is exceeded, the lens system will have a back focal length which is close to that of the lens systems for single-lens reflex cameras, thereby making it impossible to accomplish the object of the present invention. Further, the lens system will have a refractive power arrangement which is undesirably be rather asymmetrical. If the lower limit of 0.1 of the condition (4) is not reached, in contrast, a back focal length will be extremely short, imaging due to stray rays will be increased and the lens system will have a large outside diameter undesirably from viewpoints of structures of a lens barrel and lens moving mechanism.

Now, the lens system according to the present invention will be described concretely. FIG. 1 is a sectional view illustrating a composition of a first embodiment to be described later and an optical path therein. As shown in this drawing, the lens system according to the present invention is composed of three lens units G1, G2 and G3: the first lens unit G1 being disposed before an aperture stop, the second lens unit G2 being disposed after the aperture stop and the third lens unit G3 being disposed after the second lens unit G2 with a specific airspace interposed. Out of these lens units, the first lens unit G1 and the second lens unit G2 which are main lens units compose a converging lens system, whereas the third lens unit G3 is an optical system for correcting an image surface.

Listed in Table 1 below are aberration coefficients of a lens system preferred as the first embodiment 1 to be described later for infinite object distance:

TABLE 1

|    | $SA_3$    | $SA_5$    | $CM_3$    | $CM_5$    | $AS_3$    | $AS_5$    | $DT_3$    | $PT_3$    |
|----|-----------|-----------|-----------|-----------|-----------|-----------|-----------|-----------|
| G1 | 0.61592   | 0.27272   | −0.63433  | 0.1169    | 0.12398   | 0.05623   | 1.11833   | 0.18114   |
| G2 | −0.53235  | −0.18676  | −0.18712  | −0.35025  | −0.50777  | −0.16709  | −1.76827  | −0.65002  |
| G3 | −0.12537  | −0.04311  | 0.75385   | 0.29389   | 0.40822   | 0.11745   | 0.89593   | 0.34986   |
| Σ  | −0.0418   | 0.04286   | −0.0676   | 0.06054   | 0.02443   | 0.00659   | 0.24599   | −0.11902  |

As seen from Table 1 shown above, surfaces on which angles of incidence or emergence are large have large coefficients for spherical aberration. In the lens system preferred as the first embodiment, spherical aberration is overcorrected by the first lens unit G1, undercorrected by the second lens unit G2 for balancing and further corrected by the third lens unit G3. Aberration coefficients of high orders function in similar ways.

On the other hand, offaxial aberrations, i.e., coma, astigmatism and distortion, are produced by surfaces of an air lens in the first lens unit G1 and cancelled with each other by these surfaces. Astigmatism and distortion are corrected like spherical aberration by the first lens unit G1 and further corrected by the other lens units so as to be cancelled in the lens system as a whole. Aberration coefficients of high orders function in a similar way.

Coma it is characterized in that functions are rather different between aberration coefficients of the third order and aberration coefficients of high orders.

Within a range of the aberration coefficients of the third order for coma, both the first lens unit and the second lens unit undercorrect coma, and residual coma is corrected by the third lens unit. Speaking of aberration coefficients of the fifth order, the first lens unit has a function to overcorrect differently from the other lens units. Generally speaking, the third lens unit overcorrects offaxial aberrations for reducing residual aberrations.

The present invention also provides a lens system which is composed, as described above, of the three basic lens units, or the first lens unit, the second lens unit and the third lens unit which have the compositions described above; and is focused by moving the three lens units toward the object side while correcting variations of aberrations by varying at least one of airspaces reserved in the second lens unit and the third lens unit.

Speaking more concretely, the standard lens system according to the present invention is characterized in that it is composed, in order from the object side, of the first lens unit having the positive refractive power, the aperture stop, the second lens unit having the positive refractive power and the third lens unit having the negative refractive power: the first lens unit being composed of at least one positive meniscus lens component having the convex surface on the object side and at least one doublet consisting of the meniscus lens component and a negative lens component; the second lens unit being composed of at least one cemented doublet consisting of the negative lens element and the positive lens element and the positive lens component; and the third lens unit being composed of at least one positive lens component and a negative lens component: The standard lens system is focused from infinite object distance onto a finite object distance by moving the first lens unit, the second lens unit and the third lens unit toward the object side from their locations for the infinite object distance while varying at least the airspaces reserved in the second lens unit and the third lens unit at the same time.

Now, description will be made of a means which is adopted for maintaining optical performance of the lens system according to the present invention within a range from infinite distance to a finite distance.

The lens system according to the present invention is characterized in; that it is composed, as described above, of the three basic lens units; in order from the object side, the first lens unit G1 having the positive refractive power, the aperture stop S, the second lens unit G2 having the positive refractive power and the third lens unit G3 having the negative refractive power; the first lens unit G1 being composed of at least one positive meniscus lens component having the convex surface on the object side, and at least one doublet consisting of the meniscus lens component and the negative lens component; the second lens unit being composed of at least one cemented doublet consisting of the negative lens element and the positive lens element, and a positive lens component; and the third lens unit being composed of at least one positive lens component and a negative lens component: and that it is focused from infinite object distance onto a finite object distance by moving the first lens unit G1, the second lens unit G2 and the third lens unit G3 toward the object side from their locations for the infinite object distance while varying the airspaces reserved in the lens units at the same time for correcting variations of aberrations.

Focusing methods for the conventional modified Gauss type lens systems are mostly limited within those for lens systems for single-lens reflex cameras.

In contrast, the lens system according to the present invention has a short back focal length and comprises the third lens unit which is to be accommodated in a camera body housing. Accordingly, there is no preceding invention which takes a driving mechanism into consideration.

In the lens system according to the present invention, variations of aberrations are corrected by varying the airspaces reserved in the lens units as described above. When a first embodiment (FIGS. 2A and 2B) to be described later is focused from infinite distance onto a short object distance of 0.5 m, for example, variations of abberations are corrected by dividing the second lens unit G2 into subunits G2A and G2B, dividing the third lens unit G3 into subunits G3A and G3B, and moving these subunits so as to vary airspaces reserved in the lens units.

The means for correcting the variations of aberrations caused by focusing the lens system according to the present invention will be described on the basis of aberration coefficients. Table 2 below, shown below lists aberration coefficients in the first embodiment when it is focused on an object distance of 0.5 m. Aberration coefficients of the fifth order $CM_5$ and $AS_5$ for coma and astigmatism are not listed in this table.

Though there is known a method to control an image surface by varying an airspace in which an aperture stop is disposed, it is preferable not to vary this airspace since a delicate technique is required for maintaining with high precision the airspace accommodating the aperture stop. Further, for accommodating the third lens unit in a housing, it is desirable to keep this lens unit stationary so far as optical performance can be maintained from a viewpoint of correction of variations of aberrations.

For correcting aberrations in the lens system according to the present invention, it is highly advantageous to move the cemented doublet G2A and the positive lens component G2B separately in the second lens unit.

Furthermore, it is desirable that the lens system according to the present invention which is equipped with the mechanism for correcting the variations caused by focusing is configured so as to satisfy the above-mentioned conditions (1) through (4).

TABLE 2

|    | $SA_3$   | $SA_5$   | $CM_3$   | $AS_3$   | $DT_3$   | $PT_3$   |
|----|----------|----------|----------|----------|----------|----------|
| G1 | 0.47814  | 0.23646  | −0.26586 | 0.14264  | 0.58126  | 0.11484  |
| G2 | −0.56862 | −0.20729 | −0.67773 | −0.47282 | −1.13698 | −0.41208 |
| G3 | 0.04934  | 0.01514  | 0.94362  | 0.35256  | 0.61238  | 0.2218   |
| Σ  | −0.04112 | 0.04431  | 0.00003  | 0.02237  | 0.05666  | −0.07545 |

By comparing Table 2 with Table 1 which lists aberration coefficients in a condition where the first embodiment is focused on infinite distance, it will be understood that coma is slightly varied but the other aberrations are stable. Speaking concretely, variations of aberrations to be caused by focusing are suppressed by moving the partial systems (subunits G2A and G2B) of the second lens unit and the partical systems (subunits G3A and G3B) of the third lens unit which are used as a means for suppressing variations of aberrations to be caused by focusing the lens system according to the present invention.

For the first embodiment, it is desirable to compose the second lens unit of a cemented doublet G2A and a positive biconvex lens component G2B, and move the subunits G2A and G2B so as to widen an axial airspace therebetween as a magnification is enhanced from that of the infinite object distance. Further, it is desirable to move the object side positive lens component G3A and the image side negative lens component G3B of the third lens unit so as to narrow an axial airspace reserved therebetween as the magnification is enhanced.

Embodiment 1
$f = 54.999$,  F/1.43,  $2\omega = 59.0°$ $r_1 = 45.7600$
$\quad d_1 = 5.4470 \quad n_1 = 1.80400 \quad v_1 = 46.58$
$r_2 = 121.9316$
$\quad d_2 = 0.1000$
$r_3 = 29.3923$
$\quad d_3 = 5.7784 \quad n_2 = 1.74100 \quad v_2 = 52.65$
$r_4 = 58.6074$
$\quad d_4 = 1.3992$
$r_5 = 129.0872$
$\quad d_5 = 2.7831 \quad n_3 = 1.68893 \quad v_3 = 31.08$
$r_6 = 20.7811$
$\quad d_6 = 7.0996$
$r_7 = \infty$ (stop)
$\quad d_7 = 5.2572$
$r_8 = -29.0337$
$\quad d_8 = 2.0000 \quad n_4 = 1.60323 \quad v_4 = 42.32$
$r_9 = -174.2021$
$\quad d_9 = 4.2529 \quad n_5 = 1.69680 \quad v_5 = 55.53$
$r_{10} = -39.7244$
$\quad d_{10} = 0.1546$
$r_{11} = 34.7750$
$\quad d_{11} = 7.5774 \quad n_6 = 1.49700 \quad v_6 = 81.61$
$r_{12} = -71.6423$
$\quad d_{12} = 5.5579$
$r_{13} = 119.0206$
$\quad d_{13} = 11.6665 \quad n_7 = 1.49700 \quad v_7 = 81.61$
$r_{14} = -184.8317$
$\quad d_{14} = 12.9261$
$r_{15} = -21.3238$
$\quad d_{15} = 2.0000 \quad n_8 = 1.56883 \quad v_8 = 56.34$ -continued $r_{16} = -57.5286$
(object distance 0.5 m)
$d_{10} = 2.412$, $d_{12} = 8.605$, $d_{14} = 10.628$,
$f_1/f = 4.362$, $f_1/f_2 = 4.815$, $\beta_3 = 0.9558$, $f_b/f = 0.128$ $r_{17} = -57.8521$
(object distance 0.5 m)
$d_{11} = 2.857$, $d_{13} = 10.566$, $d_{15} = 12.367$,
$f_1/f = 4.469$, $f_1/f_2 = 4.809$, $\beta_3 = 0.9198$, $f_b/f = 0.128$ Embodiment 2
f = 55.0,   F/1.43,   2ω = 59.1°

| | | | |
|---|---|---|---|
| $r_1 = 47.5290$ | | | |
| | $d_1 = 5.5642$ | $n_1 = 1.80400$ | $\nu_1 = 46.58$ |
| $r_2 = 166.0697$ | | | |
| | $d_2 = 0.1000$ | | |
| $r_3 = 29.1493$ | | | |
| | $d_3 = 5.5747$ | $n_2 = 1.78650$ | $\nu_2 = 50.00$ |
| $r_4 = 54.6427$ | | | |
| | $d_4 = 1.2922$ | | |
| $r_5 = 100.0344$ | | | |
| | $d_5 = 1.9000$ | $n_3 = 1.68893$ | $\nu_3 = 31.08$ |
| $r_6 = 19.9050$ | | | |
| | $d_6 = 1.9000$ | $n_4 = 1.78590$ | $\nu_4 = 44.19$ |
| $r_7 = 19.7377$ | | | |
| | $d_7 = 7.4732$ | | |
| $r_8 = \infty$ (stop) | | | |
| | $d_8 = 4.2625$ | | |
| $r_9 = -38.0892$ | | | |
| | $d_9 = 6.1567$ | $n_5 = 1.70154$ | $\nu_5 = 41.24$ |
| $r_{10} = -17.2836$ | | | |
| | $d_{10} = 1.9000$ | $n_6 = 1.74950$ | $\nu_6 = 35.27$ |
| $r_{11} = -51.9093$ | | | |
| | $d_{11} = 0.1000$ | | |
| $r_{12} = 36.0019$ | | | |
| | $d_{12} = 7.6754$ | $n_7 = 1.49700$ | $\nu_7 = 81.61$ |
| $r_{13} = -60.5726$ | | | |
| | $d_{13} = 7.3838$ | | |
| $r_{14} = 159.3934$ | | | |
| | $d_{14} = 9.1431$ | $n_8 = 1.77250$ | $\nu_8 = 49.60$ |
| $r_{15} = -168.6921$ | | | |
| | $d_{15} = 11.6742$ | | |
| $r_{16} = -22.1595$ | | | |
| | $d_{16} = 1.9000$ | $n_9 = 1.51602$ | $\nu_9 = 56.80$ |
| $r_{17} = -86.6002$ | | | |

(object distance 0.5 m)
$d_{11} = 1.727$, $d_{13} = 10.727$, $d_{15} = 9.691$,
$f_1/f = 2.857$, $f_1/f_2 = 2.823$, $\beta_3 = 0.9194$, $f_b/f = 0.128$ Embodiment 3
f = 55.0,   F/1.43,   2ω = 57.4°

| | | | |
|---|---|---|---|
| $r_1 = 49.4345$ | | | |
| | $d_1 = 5.2541$ | $n_1 = 1.80400$ | $\nu_1 = 46.58$ |
| $r_2 = 144.4196$ | | | |
| | $d_2 = 0.1000$ | | |
| $r_3 = 29.9959$ | | | |
| | $d_3 = 6.0063$ | $n_2 = 1.74100$ | $\nu_2 = 52.65$ |
| $r_4 = 65.0048$ | | | |
| | $d_4 = 1.2966$ | | |
| $r_5 = 140.2035$ | | | |
| | $d_5 = 2.0000$ | $n_3 = 1.74000$ | $\nu_3 = 31.71$ |
| $r_6 = 21.2642$ | | | |
| | $d_6 = 2.0000$ | $n_4 = 1.74077$ | $\nu_4 = 27.79$ |
| $r_7 = 21.5858$ | | | |
| | $d_7 = 6.7796$ | | |
| $r_8 = \infty$ (stop) | | | |
| | $d_8 = 4.9813$ | | |
| $r_9 = -31.1827$ | | | |
| | $d_9 = 2.0000$ | $n_5 = 1.60717$ | $\nu_5 = 40.26$ |
| $r_{10} = 659.8383$ | | | |
| | $d_{10} = 4.8846$ | $n_6 = 1.67000$ | $\nu_6 = 57.33$ |
| $r_{11} = -41.5361$ | | | |
| | $d_{11} = 0.5896$ | | |
| $r_{12} = 33.3443$ | | | |
| | $d_{12} = 7.3606$ | $n_7 = 1.49700$ | $\nu_7 = 81.61$ |
| $r_{13} = -93.5696$ | | | |
| | $d_{13} = 7.7202$ | | |
| $r_{14} = 116.0042$ | | | |
| | $d_{14} = 6.8116$ | $n_8 = 1.63854$ | $\nu_8 = 55.38$ |
| $r_{15} = -222.5918$ | | | |
| | $d_{15} = 14.2155$ | | |
| $r_{16} = -21.3304$ | | | |
| | $d_{16} = 2.0000$ | $n_9 = 1.56965$ | $\nu_9 = 49.33$ |

Embodiment 4
f = 54.999,   F/1.43,   2ω = 57.1°

| | | | |
|---|---|---|---|
| $r_1 = 44.6506$ | | | |
| | $d_1 = 5.7896$ | $n_1 = 1.78650$ | $\nu_1 = 50.00$ |
| $r_2 = 140.5434$ | | | |
| | $d_2 = 0.1705$ | | |
| $r_3 = 28.9105$ | | | |
| | $d_3 = 5.4255$ | $n_2 = 1.72916$ | $\nu_2 = 54.68$ |
| $r_4 = 51.5275$ | | | |
| | $d_4 = 1.8949$ | | |
| $r_5 = 111.5667$ | | | |
| | $d_5 = 2.0000$ | $n_3 = 1.68893$ | $\nu_3 = 31.08$ |
| $r_6 = 20.9459$ | | | |
| | $d_6 = 7.0373$ | | |
| $r_7 = \infty$ (stop) | | | |
| | $d_7 = 5.0799$ | | |
| $r_8 = -30.2712$ | | | |
| | $d_8 = 2.5730$ | $n_4 = 1.60323$ | $\nu_4 = 42.32$ |
| $r_9 = -290.1994$ | | | |
| | $d_9 = 4.9666$ | $n_5 = 1.71300$ | $\nu_5 = 53.84$ |
| $r_{10} = -42.2289$ | | | |
| | $d_{10} = 0.84527$ | | |
| $r_{11} = 33.6138$ | | | |
| | $d_{11} = 7.6346$ | $n_6 = 1.49700$ | $\nu_6 = 81.61$ |
| $r_{12} = -83.5858$ | | | |
| | $d_{12} = 9.7135$ | | |
| $r_{13} = 97.2164$ | | | |
| | $d_{13} = 7.3950$ | $n_7 = 1.51633$ | $\nu_7 = 64.15$ |
| $r_{14} = -287.1247$ | | | |
| | $d_{14} = 11.4744$ | | |
| $r_{15} = -21.7685$ | | | |
| | $d_{15} = 2.0000$ | $n_8 = 1.58267$ | $\nu_8 = 46.33$ |
| $r_{16} = -62.2163$ | | | |

(object distance 0.5 m)
$d_{10} = 3.414$, $d_{12} = 12.731$, $d_{14} = 9.238$,
$f_1/f = 3.942$, $f_1/f_2 = 4.405$, $\beta_3 = 0.9725$, $f_b/f = 0.128$ wherein the reference symbols $r_1$, $r_2$, ... represent radii of curvature on respective lens surfaces, the reference symbols $d_1$, $d_2$, ... designate thickness of respective lens elements and airspaces reserved therebetween, the reference symbols $n_1$, $n_2$, ... denote refractive indices of the respective lens elements, and the reference symbols $\nu_1$, $\nu_2$, ... represent Abbe's numbers of the respective lens elements. In the numerical data listed above, distances such as focal lengths are specified in millimeters.

Figure 2A:
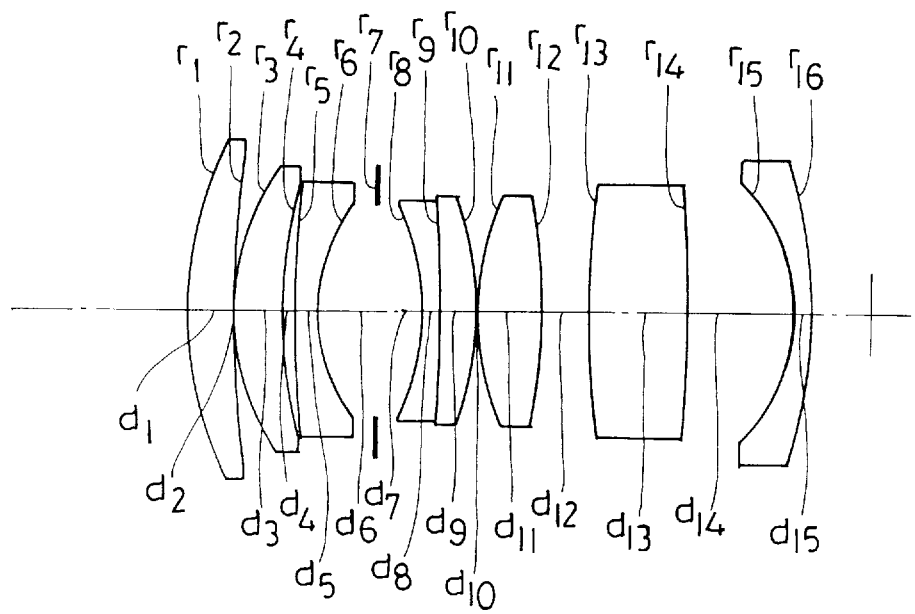
FIGS. 2A and 2B show sectional views illustrating a composition of the first embodiment of the present invention.
Figure 2B:
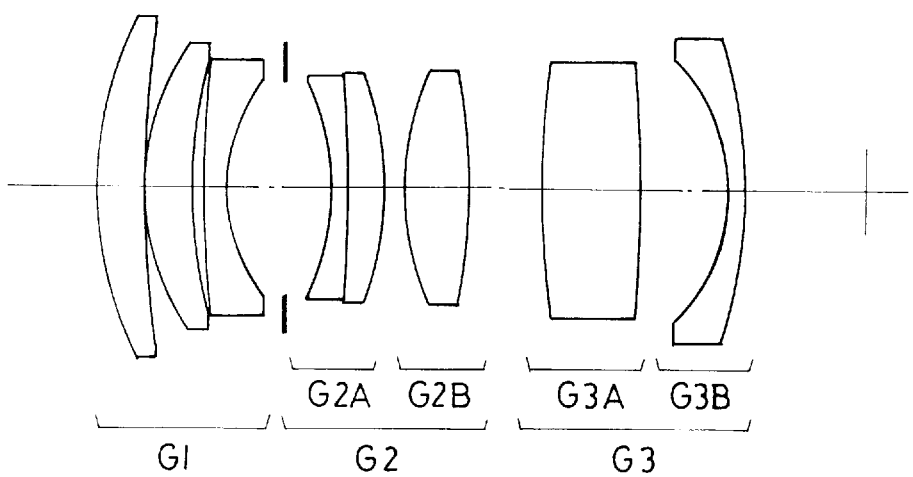

The first embodiment has a composition illustrated in FIGS. 2A and 2B: FIG. 2A showing the first embodiment in a condition where it is focused on infinite distance and FIG. 2B showing it in a condition where it is focused on an object distance of 0.5 m. The first embodiment is configured as the so-called standard lens system which has a focal length of 55 mm, a field angle of 42.94° and an aperture ratio of 1:1.43.

In this lens system, an aperture stop is disposed between a first lens unit G1 and a second lens unit G2, and a positive biconvex lens component and a negative meniscus lens component are disposed in a third lens unit G3. A first lens unit G1 is composed, in order from the object side, of a positive meniscus lens component, and a doublet consisting of a positive meniscus lens component having a convex surface on the object side and a negative meniscus lens component having a strongly concave surface on the image side which are disposed with an airspace reserved therebetween, whereas a second lens is composed of a cemented doublet consisting of a negative meniscus lens element having a strongly concave surface on the image side and a positive meniscus lens element having a convex surface on the object side, and a biconvex lens component.

The first embodiment produces distortion in an extremely small amount in contrast to the standard lens system for single-lens reflex cameras which produces negative distortion in a relatively large amount. Further, lateral chromatic aberration is scarecely curved due to aberration of high orders.

Figure 3A:
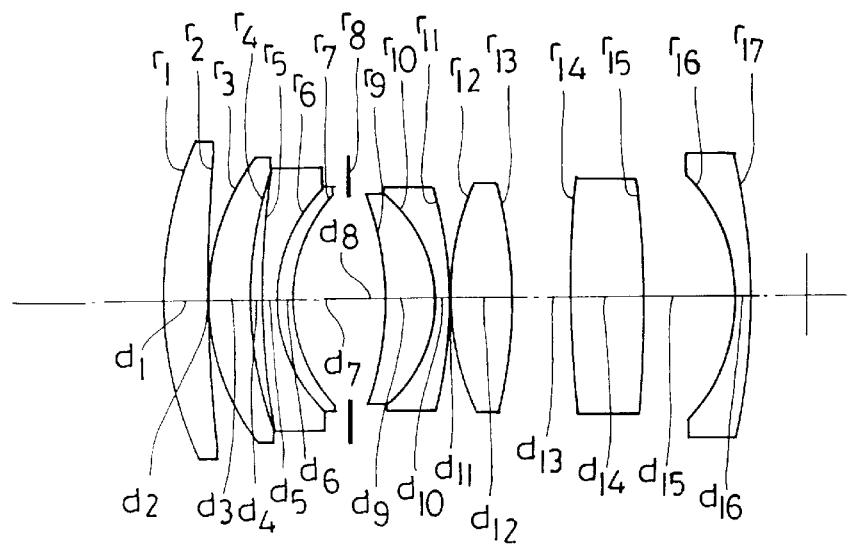
FIGS. 3A and 3B show sectional views illustrating a composition of a second embodiment of the present invention.
Figure 3B:
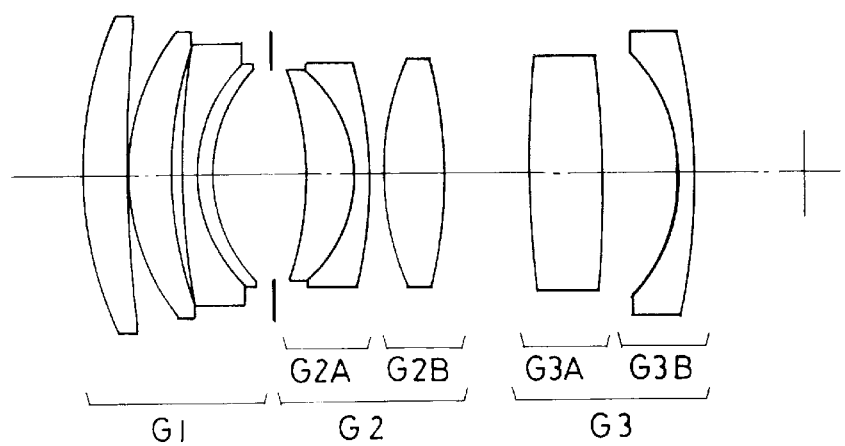

A second embodiment is a lens system which is illustrated in FIGS. 3A and 3B, and has a focal length of 55 mm, a field angle of 42.94° and an aperture ratio of 1:1.43. The second embodiment is characterized in that a cemented doublet consisting of a negative meniscus lens element and a positive lens element is used as a third lens component of a first lens unit, and a cemented lens component consisting of a positive meniscus lens element and a negative meniscus lens element is used as a first lens component of a second lens unit.

In the second embodiment, aberrations are corrected similarly to those in the first embodiment.

Figure 4A:
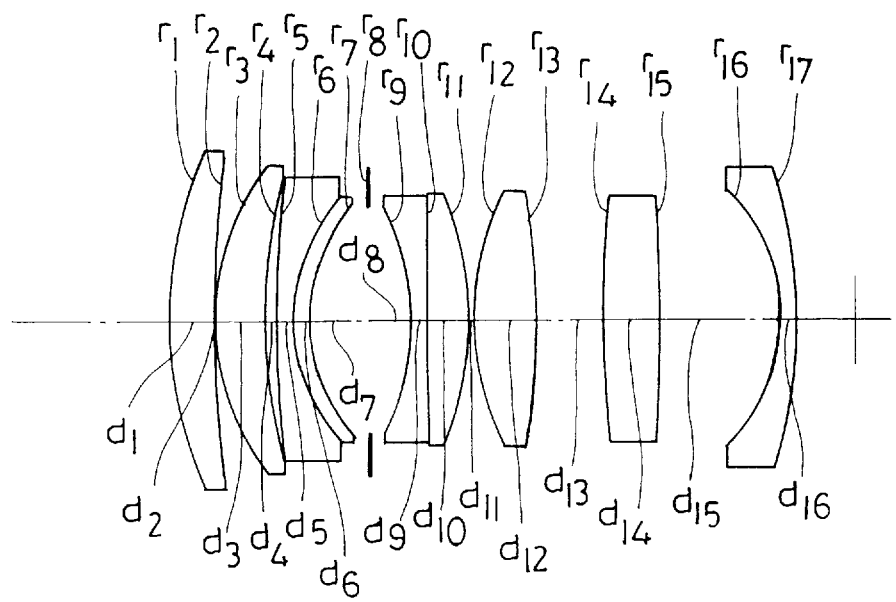
FIGS. 4A and 4B show sectional views illustrating a composition of a third embodiment of the present invention.
Figure 4B:
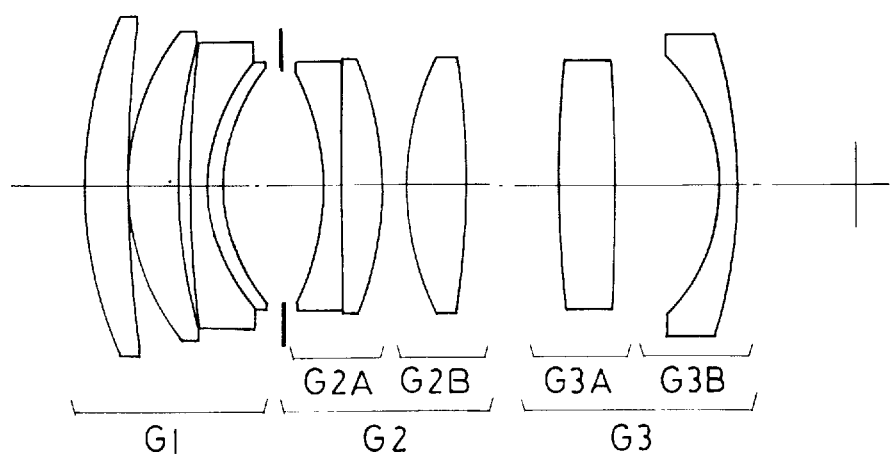

A third embodiment is a lens system which has a composition illustrated in FIGS. 4A and 4B, or is configured to have a focal length of 55 mm, a field angle of 42.94° and an aperture ratio of 1:1.43. Differently from the second embodiment, the third embodiment uses, as a first lens component of a second lens unit, a cemented lens component consisting of a negative lens element having a strongly concave surface on the object side and a positive lens element having a strongly convex surface on the image side.

Figure 5A:
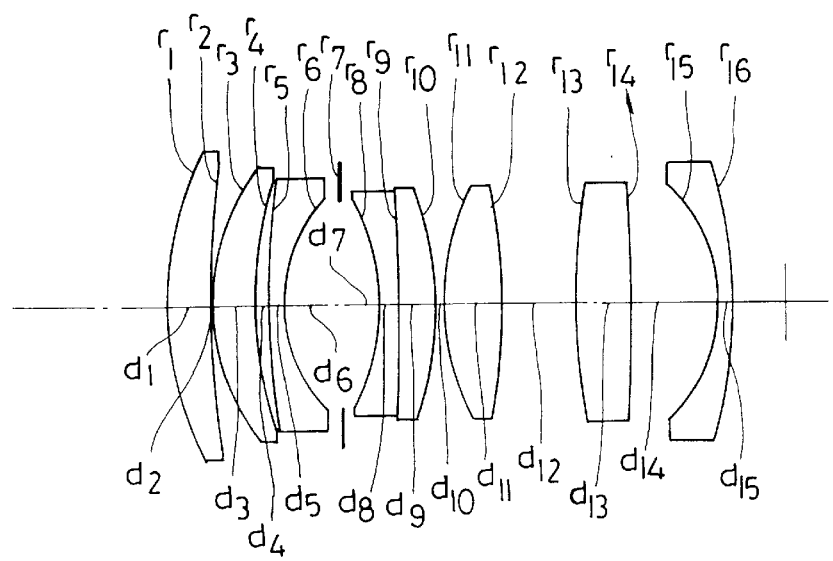
FIGS. 5A and 5B show sectional views illustrating a composition of a fourth embodiment of the present invention.
Figure 5B:
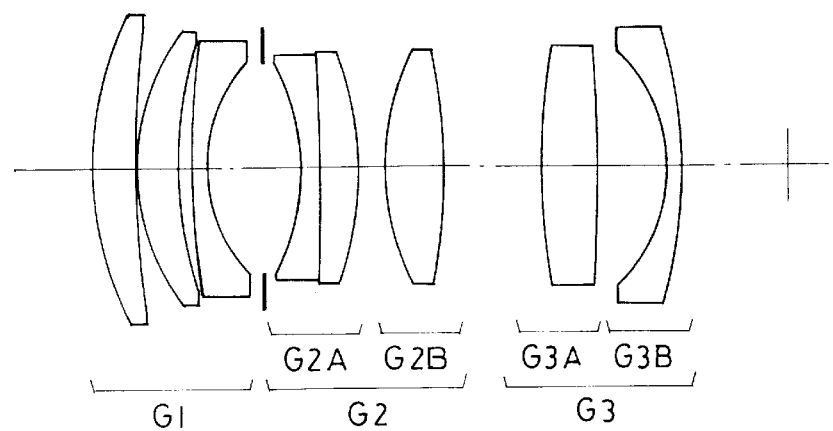

A fourth embodiment illustrated in FIGS. 5A and 5B is a variation of the first embodiment wherein a lens system is configured so as to have a smaller astigmatic difference.

The fourth embodiment is a lens system wherein astigmatism and lateral chromatic aberration are favorably corrected.

FIGS. 5A and 5B show the lens system in a condition where it is focused on infinite object distance and another condition where it is focused on an object distance of 0.5 m, respectively.

A second lens system according to the present invention is a standard lens system which is characterized in; that it is composed of three basic lens units; in order from the object side, a first lens unit having a positive refractive power, an aperture stop, a second lens unit having a positive refractive power and a third lens unit having a negative refractive power; the first lens unit being composed of at least one positive meniscus lens component having a convex surface on the object side, and at least one doublet consisting of a positive lens element and a negative lens element; the second lens unit being composed of at least one cemented doublet consisting of a negative lens element and a positive lens element; and the third lens unit being composed of at least one negative lens component. The second lens system uses at least one aspherical surface in any one of the lens units; and satisfies the following conditions (5) through (8) at the same time:

(5) $0.5 < f_2/f < 10$ (6) $1.0 < f_1/f_2 < 15$ (7) $0.8 < \beta_3 < 1.3$ (8) $0.05 < f_b/f < 0.5$ In the lens system having the composition described above, it is natural that the first lens unit and the second lens unit disposed on both sides of the aperture stop have positive refractive pours since they are originally converging lens systems and it is apparent from optical principles that the refractive power distribution described above is desirable for correcting aberrations by making use of the merits of the symmetrical composition of the lens system. For maintaining flatness of an offaxial image surface, or correction of curvature of field, and for configuring the lens system compactly, it is preferable to select a weak refractive power for the third lens unit having the negative refractive power. For the reasons described above, the lens system according to the present invention is composed, in order from the object side, of the first lens unit having the positive refractive power, the second lens unit having the positive refractive power and the third lens unit having the negative refractive power; and the first lens unit and the second lens unit are composed nearly symmetrically for correcting an image surface.

The condition (5) defines a refractive power of the second unit. This condition is important for obtaining a nearly symmetrical refractive power arrangement in a main lens system which is different from the refractive power arrangement in the conventional lens systems for single-lens reflex cameras.

If the second lens unit has a refractive power below the lower limit of 0.5 of the condition (5), it will be preferable for configuring the lens system compactly, but the first lens unit will have a strong refractive power, thereby making it difficult to correct curvature of field and coma. Such a strong refractive power of the second lens unit may be advantageous for correcting aberrations on an image of an object located at a specific finite distance, but is not desirable within the range of photographing distances at which the standard lens system is to be used. If the second lens unit has a refractive power exceeding the upper limit of 10, it will be advantageous for correcting aberrations, but undesirably enlarge the lens system. Further, such a strong refractive power of the second lens unit will degrade the symmetry defined by the condition (6), whereby the lens system will have a refractive power distribution which is close to that of the lens systems for single-lens reflex cameras and tend to produce remarkable asymmetrical aberrations.

The condition (6) defines a ratio of a focal length of the first lens unit relative to that of the second lens unit. This ratio expresses a factor of symmetry and is used for determining a refractive power of the second lens unit after a refractive power of the first lens unit has been selected.

If the lower limit of the condition (6) is not reached, the refractive powers will be highly symmetrical with regard to the aperture stop, but aberrations cannot be corrected adequately at object distances in the vicinities of infinite distance. This means that a completely symmetrical refractive power distribution is not always desirable for a lens system which is to be used, like a photographic lens system, while being focused within a wide range of object distances. If the upper limit of 15 of the condition (6) is exceeded, asymmetry will be remarkable, whereby coma, astigmatism and lateral chromatic aberration will remain in large amounts.

The condition (7) defines an imaging magnification of the third lens unit. If the third lens unit has an imaging magnification below the lower limit of 0.8 of the condition (7), it will be advantageous for correcting aberrations, but will enlarge the lens system which has a high aperture ratio, thereby making it impossible to obtain a desirable result. If the upper limit of 1.3 of the condition (7) is exceeded, the first lens unit and the second lens unit will have a long total focal length, thereby making it difficult to correct aberrations. At the same time, it will be difficult to balance a high aperture ratio with compactness of the lens system since longitudinal aberrations may vary in proportion to a square of the imaging magnification $\beta_3$ of the third lens unit.

The condition (8) defines a range wherein the lens system according to the present invention is to be used directly in terms of a back focal length. If the upper limit of 0.5 of the condition (8) is exceeded, the lens system will have a back focal length close to that of the lens systems for single-lens reflex cameras, thereby making it impossible to accomplish the object of the present invention. Further, the lens system according to the present invention will undesirably have a refractive power arrangement which is rather asymmetrical. If the lower limit of 0.05 of the condition (8) is exceeded, in contrast, a back focal length will be extremely short, imaging due to stray rays will be increased and the lens system will have a large outside diameter which is undesirable from viewpoints of a lens barrel and a lens moving mechanism.

order and those of aberration coefficients of high orders which are different to certain degrees.

Within a range of aberration coefficients of the third order, the first lens unit undercorrects coma, the second lens unit overcorrects it and the third lens unit correct residual coma as understood from Table 3. Aberration coefficients of the fifth order tend to function in a similar way.

Table 4, shown below, lists aberration coefficients of an eighth embodiment having an aperture ratio of 1:1 to be described later.

TABLE 4

|    | $SA_3$   | $SA_5$   | $CM_3$   | $CM_5$  | $AS_3$   | $AS_5$   | $DT_3$   | $PT_3$   |
|----|----------|----------|----------|---------|----------|----------|----------|----------|
| G1 | 2.19810  | 0.32319  | -3.72183 | 0.17000 | -0.05200 | -0.06003 | 2.26202  | 0.16147  |
| G2 | -2.46657 | -1.24129 | 1.58234  | 1.45467 | -0.59032 | -0.24228 | -3.87159 | -1.33316 |
| G3 | 0.38351  | 0.27797  | 2.11518  | 1.00949 | 0.92438  | -0.23644 | 1.58229  | 0.86182  |
| Σ  | 0.11504  | -0.64013 | -0.02431 | 2.63416 | 0.28205  | -0.53875 | -0.02728 | -0.30987 |

Figure 6A:
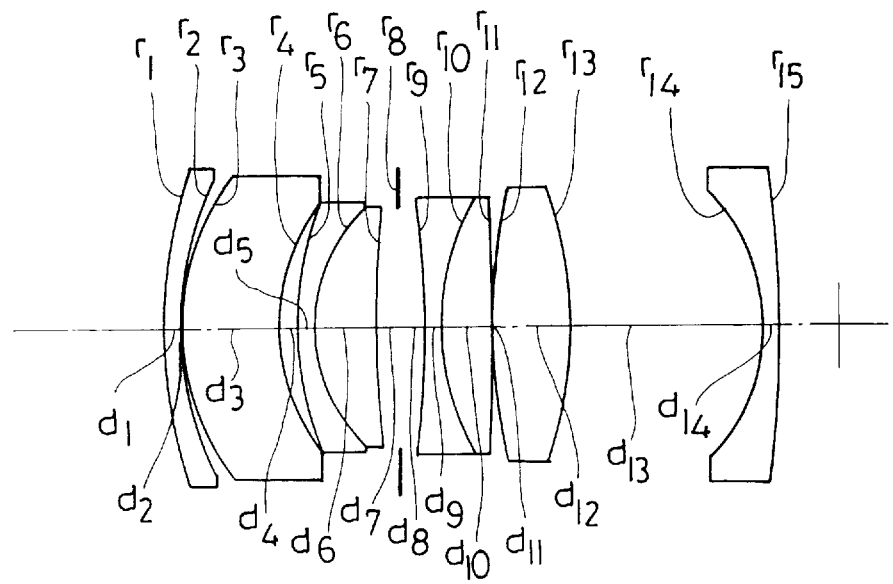
FIGS. 6A and 6B show sectional views visualizing a composition of a fifth embodiment of the present invention.
Figure 6B:
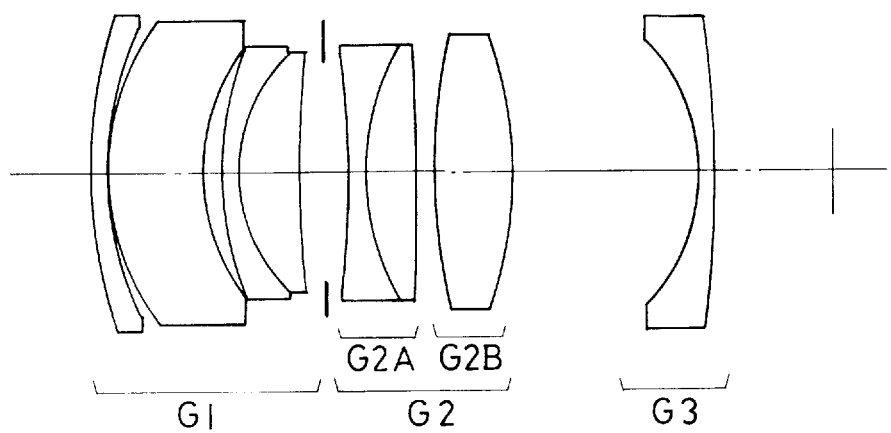

Now, the lens system according to the present invention will be described concretely. FIGS. 6A and 6B are sectional views illustrating a fifth embodiment to be described later. As shown in these drawings, the lens system according to the present invention is composed of three lens units G1, G2 and G3: the first lens unit G1 being disposed before an aperture stop, the second lens unit G2 being disposed after the aperture stop and the third lens unit G3 being disposed after the second lens unit G2. Out of these lens units, the first and second lens units G1 and G2, which are main lens systems, compose a converging system, whereas the third lens unit G3, which is an optical system for correcting an image surface, is composed of a single meniscus lens component in the fifth embodiment.

Table 3 shown below lists aberration coefficients of the fifth embodiment in a condition where it is focused in infinite object distance.

In the eighth embodiment, each lens unit uses an aspherical surface for enhancing an imaging magnification. In a lens system having a high aperture ratio like the eighth embodiment, paraxial rays are incident high and a light bundle is thick, thereby producing aberrations in large amounts. From the conditions of aberrations which are expressed by the aberration coefficients adopted for the eighth embodiment, it will be understood that the aspherical surfaces allow aberration coefficients of high orders to remarkably exhibit their functions and, for coma in particular, make aberration coefficient of the fifth order more remarkable than the aberration coefficient of the third order.

Table 5 and Table 6, shown below, list aberration coefficients of the third and fifth orders ($SA_3$ and $SA_5$) of surfaces for spherical aberration in the fifth and eighth embodiments respectively. An eighth surface is an aperture stop in each of the embodiments.

TABLE 3

|    | $SA_3$   | $SA_5$   | $CM_3$   | $CM_5$   | $AS_3$   | $AS_5$   | $DT_3$   | $PT_3$   |
|----|----------|----------|----------|----------|----------|----------|----------|----------|
| G1 | 1.51118  | 0.97367  | -1.85695 | -1.89062 | 0.41885  | 0.16007  | 0.56973  | -0.02633 |
| G2 | -1.78535 | -0.64875 | 1.29865  | 0.86008  | -0.34496 | -0.14332 | -1.56098 | -0.76137 |
| G3 | 0.13381  | 0.03465  | 0.64328  | 0.09484  | -0.07103 | 0.01816  | 0.98949  | 0.68664  |
| Σ  | -0.14036 | 0.35957  | 0.08498  | -0.93570 | 0.00287  | 0.03491  | -0.00176 | -0.10107 |

As apparent from Table 3 shown above, surfaces which have large angles of incidence or emergence have large aberration coefficients for spherical aberration. In the fifth embodiment, spherical aberration is overcorrected by the first lens unit G1, undercorrected by the second lens unit G2 for balancing and further corrected by the third lens unit G3. Aberration coefficients of high orders function in similar ways.

Coma, astigmatism and distortion, which are offaxial aberrations are produced by surfaces of an air lens disposed in the first lens unit G1 and cancelled with each other by these surfaces. Astigmatism and distortion are corrected by the first lens unit G1 and cancelled, like spherical aberration, among the lens units. Aberration coefficients of high orders function in similar ways.

On the other hand, coma is characterized in that it is subjected to functions of aberration coefficients of the third

TABLE 5

|    | $SA_3$   | $SA_5$   |
|----|----------|----------|
| 1  | 1.04289  | 1.04251  |
| 2  | 0.85278  | 0.27012  |
| 3  | -2.02704 | -0.72525 |
| 4  | 1.35334  | 0.44025  |
| 5  | -0.37054 | -0.10821 |
| 6  | 0.73558  | 0.30279  |
| 7  | -0.00048 | -0.00121 |
| 8  | 0        | 0        |
| 9  | 0.04257  | -0.02342 |
| 10 | -0.25388 | -0.11201 |
| 11 | -0.00848 | 0.00850  |
| 12 | 0.00123  | 0.00152  |
| 13 | -2.38982 | -0.73468 |

TABLE 5-continued

|    | $SA_3$   | $SA_5$   |
|----|----------|----------|
| 14 | 0.28341  | 0.03510  |
| 15 | -0.08792 | -0.02213 |
| Σ  | -0.82635 | 0.37388  |

TABLE 6

|    | $SA_3$   | $SA_5$   |
|----|----------|----------|
| 1  | -1.69661 | -0.38174 |
| 2  | -0.43553 | -0.27325 |
| 3  | 1.69402  | 0.26607  |
| 4  | 0.91074  | 0.21507  |
| 5  | 0.23357  | -0.03812 |
| 6  | -0.43322 | -0.11020 |
| 7  | -0.14302 | 0.00568  |
| 8  | 0        | 0        |
| 9  | 0.40756  | 0.01074  |
| 10 | -0.09027 | -0.02302 |
| 11 | -0.51733 | -0.04824 |
| 12 | 0.01080  | -0.00050 |
| 13 | -2.12538 | -0.73962 |
| 14 | 0.61727  | 0.31267  |
| 15 | -0.74371 | -0.38550 |
| 16 | 0.73868  | 0.17603  |
| 17 | -0.25238 | -0.10233 |
| Σ  | -1.82482 | -1.11627 |

As understood from the tables shown above, not only surfaces of an air lens but also the aspherical surfaces allow aberration coefficients of high orders to remarkably exhibit their functions or greatly contribute to correction of aberrations. Only from spherical aberration, correcting functions of the aspherical surfaces can be comprehended.

Figure 9:
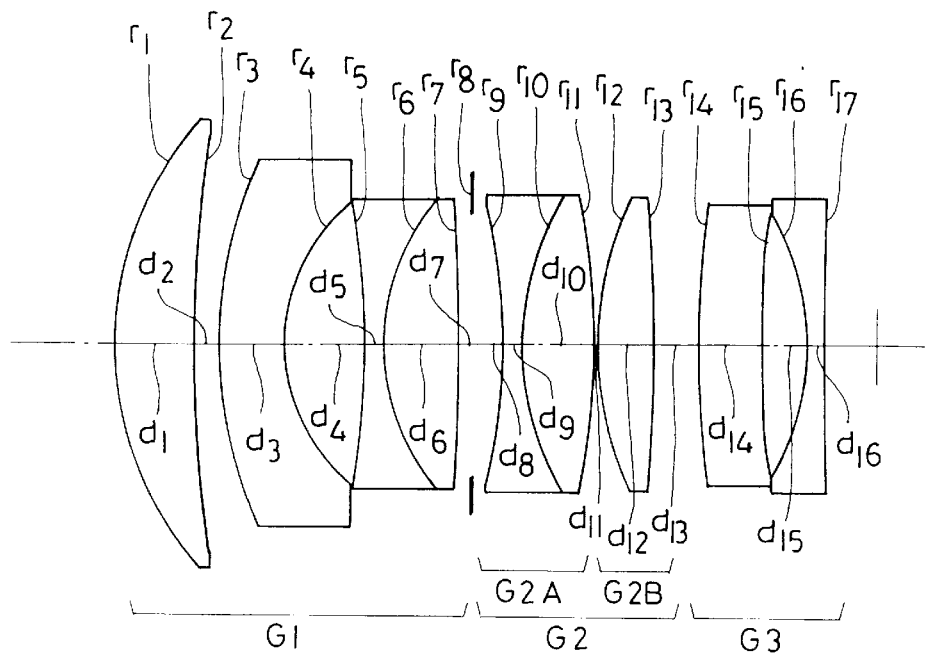

The functions of the aspherical surfaces for correcting aberrations of high orders are more remarkable at a higher aperture ratio. As shown in FIG. 9 illustrating the eighth embodiment, a first lens unit is not configured as the ordinary Gauss type, but is composed of a positive meniscus lens component and a negative meniscus lens component disposed on the image side of the positive lens component; the negative meniscus lens component being configured so as to have an aspherical surface on the object side for extremely facilitating correction of spherical aberration and allow a light bundle to emerge from an image side surface thereof at a narrow diverging angle for obtaining an effect to correct sagittal coma, or so that the lens component can have a function like that of a negative meniscus lens component used in a lens system having a wide field angle. Further, an aspherical surface used as an image side surface of a biconvex lens component disposed in a second lens unit makes it possible to balance and delicately correct aberrations remaining in the first lens unit and a third lens unit, and has a departure from a reference sphere which is not so large. The third lens unit is composed of a positive lens component and a negative lens component, and an aspherical surface is used as an image side surface of the positive lens component. The aspherical surfaces have a role to correct curvature of field and it is desirable that these surfaces function to correct a marginal image surface in particular.

In addition to the effective use of the aspherical surface described above, it is necessary for enhancing imaging performance within a range from infinite object distance to finite object distance to suppress a variation of an optimum image surface by varying airspaces for the purpose of suppressing variations of aberrations in each of the lens units to be caused by focusing. For this reason, the lens system according to the present invention is composed of the three basic lens units; in order from the object side, of the first lens unit having the positive refractive power, the aperture stop, the second lens unit having the positive refractive power and the third lens unit having the negative refractive power; the first lens unit being composed of at least one positive meniscus lens component having the convex surface on the object side, and at least one doublet consisting of the positive lens element and the negative lens element; the second lens unit comprising at least one cemented doublet consisting of the negative lens element and the positive lens element, and the positive lens component; and the third lens unit being composed of at least one negative lens component uses at least one aspherical surface in any one of the lens units and is focused from infinite object distance onto a finite object distance by moving the first lens unit, the second lens unit and the third lens unit toward the object side from their locations for the infinite object distance while varying an airspace reserved in each of the lens units for suppressing variations of aberrations. Speaking more concretely, at least either of an airspace reserved in the second lens unit and an airspace reserved in the third lens unit is variable.

It is conventionally known that spherical aberration and astigmatism are varied in different directions when a lens system is focused by moving the lens system as a whole. For correcting these variations of aberrations, the lens systems for single-lens reflex cameras adopt the so-called floating method. For a lens system having a back focal length on which loose restrictions are imposed like the lens system according to the present invention, however, there is known no method for suppressing variations of aberrations to be caused by focusing.

In the lens system according to the present invention which has the composition described above, offaxial aberrations are corrected during the movements of the lens units for focusing so as to minimize a variation of a standard image surface on the basis of correction of spherical aberration.

Table 7 and Table 8, shown below, list aberration coefficients in a conditions where the lens system preferred as the eighth embodiment is focused on the infinite object distance and the finite object distance, respectively.

TABLE 7

|    | $SA_3$   | $SA_5$   | $CM_3$   | $CM_5$  | $AS_3$   | $AS_5$   |
|----|----------|----------|----------|---------|----------|----------|
| G1 | 2.19810  | 0.32319  | -3.72183 | 0.17000 | -0.05200 | -0.06003 |
| G2 | -2.46657 | -1.24129 | 1.58234  | 1.45467 | -0.59032 | -0.24228 |
| G3 | 0.38351  | 0.27797  | 2.11518  | 1.00949 | 0.92438  | -0.23644 |
| Σ  | 0.11504  | -0.64013 | -0.02431 | 2.63416 | 0.28205  | -0.53875 |
|    | $DT_3$   | $PT_3$   |          |         |          |          |
| G1 | 2.26202  | 0.16147  |          |         |          |          |
| G2 | -3.87159 | -1.33316 |          |         |          |          |
| G3 | 1.58229  | 0.86182  |          |         |          |          |
| Σ  | -0.02728 | -0.30987 |          |         |          |          |

TABLE 8

|    | $SA_3$   | $SA_5$   | $CM_3$   | $CM_5$  | $AS_3$   | $AS_5$   |
|----|----------|----------|----------|---------|----------|----------|
| G1 | 1.71219  | 0.39824  | -2.76566 | 0.0008  | 0.10437  | -0.00289 |
| G2 | -2.44413 | -1.17381 | -0.18800 | 0.49692 | -0.85819 | -0.18375 |
| G3 | 0.76887  | 0.44123  | 3.24372  | 0.55016 | 0.99280  | -0.22087 |
| Σ  | 0.03694  | -0.33434 | 0.29006  | 1.04788 | 0.23897  | -0.40750 |
|    | $DT_3$   | $PT_3$   |          |         |          |          |
| G1 | 1.22056  | 0.11416  |          |         |          |          |

TABLE 8-continued

| | $SA_3$ | $SA_5$ | $CM_3$ | $CM_5$ | $AS_3$ | $AS_5$ |
|---|---|---|---|---|---|---|
| G2 | −2.76246 | −0.94249 | | | | |
| G3 | 1.67234 | 0.60927 | | | | |
| Σ | 0.13044 | −0.21906 | | | | |

As understood from these tables, the lens system preferred as the eighth embodiment allows spherical aberration and astigmatism to be varied in the same tendency by focusing. This tendency is obtained by varying airspaces $d_{11}$ and $d_{13}$.

Table 9, shown below, lists variations caused by varying each airspace for a distance of +0.01 mm in the eighth embodiment variations of a back focal length $\Delta f_b$ which are primary variations, variations of spherical aberration which is an actual aberration (zonal spherical aberration SA) and variations of meridional astigmatism $\Delta m$.

TABLE 9

| k | $\Delta f_b$ | SA | $\Delta m$ |
|---|---|---|---|
| 1 | −0.00533 | −0.00122 | 0.00019 |
| 2 | −0.00617 | −0.00168 | −0.00032 |
| 3 | −0.01287 | 0.00159 | 0.00720 |
| 4 | −0.00083 | 0.00088 | 0.00220 |
| 5 | −0.00004 | 0.00003 | 0.00155 |
| 6 | −0.00045 | 0.00040 | 0.00175 |
| 7 | −0.00137 | 0.00096 | 0.00296 |
| 8 | −0.00137 | 0.00096 | 0.00295 |
| 9 | −0.0007 | 0.00009 | 0.00238 |
| 10 | −0.00023 | 0.00027 | 0.00232 |
| 11 | −0.00219 | 0.00095 | 0.00275 |
| 12 | −0.00537 | 0.00063 | 0.00042 |
| 13 | −0.01025 | −0.00144 | −0.00035 |
| 14 | −0.00726 | −0.00090 | 0.00002 |
| 15 | −0.01296 | −0.00156 | 0.00160 |
| 16 | −0.00650 | 0.00024 | 0.00114 |

Table 9 shown above indicates that it is possible, by floating the doublet and the positive lens component disposed on the image side thereof, to sufficiently suppress variations of aspherical aberration coefficients and prevent shift of an image surface due to variations of pupil aberrations caused by changing a magnification. Further, it indicates that delicate correction is facilitated by varying airspaces in the second lens unit and the third lens unit in addition to the airspace mentioned above. Speaking more concretely, it will be understood from the underlined values of $\Delta f_b$, SA and $\Delta m$ that variations of a back focal length, spherical aberration and an image surface can be corrected by varying the airspaces $d_{11}$ and $d_{13}$.

Though it is effective for actual correction of an image surface to adopt the floating method which varies not only airspaces reserved between the lens units but also the airspaces reserved in the lens units, it is desirable to reduce a number of lens units to be moved from view-points of design of a lens barrel and accumulation of manufacturing errors. Though it is effective for correcting aberrations to vary an airspace accommodating an aperture stop in particular, it is difficult to vary it with high precision since it contains a stop mechanism.

Listed below is numerical data for fifth through thirteenth embodiments of the second lens system according to the present invention:

Embodiment 5

| f = 50.5, | F/1.459, | $2\omega$ = 46.72° |
|---|---|---|
| $r_1$ = 48.1869 | (aspherical surface) | |
| $d_1$ = 1.9000 | $n_1$ = 1.53113 | $v_1$ = 62.44 |
| $r_2$ = 37.4228 | | |
| $d_2$ = 0.1000 | | |
| $r_3$ = 28.0189 | | |
| $d_3$ = 11.4661 | $n_2$ = 1.80518 | $v_2$ = 25.43 |
| $r_4$ = 24.3263 | | |
| $d_4$ = 2.3008 | | |
| $r_5$ = 39.6527 | | |
| $d_5$ = 1.9000 | $n_3$ = 1.80518 | $v_3$ = 25.43 |
| $r_6$ = 19.4442 | | |
| $d_6$ = 7.2822 | $n_4$ = 1.61800 | $v_4$ = 63.39 |
| $r_7$ = 127.9057 | | |
| $d_7$ = 2.7460 | | |
| $r_8$ = ∞ (stop) | | |
| $d_8$ = 2.9687 | | |
| $r_9$ = −103.1902 | | |
| $d_9$ = 1.9962 | $n_5$ = 1.59551 | $v_5$ = 39.21 |
| $r_{10}$ = 30.4862 | | |
| $d_{10}$ = 5.8361 | $n_6$ = 1.77250 | $v_6$ = 49.60 |
| $r_{11}$ = −690.9782 | | |
| $d_{11}$ = 0.1000 | | |
| $r_{12}$ = 74.4967 | | |
| $d_{12}$ = 9.1718 | $n_7$ = 1.77250 | $v_7$ = 49.60 |
| $r_{13}$ = −48.7209 | | |
| $d_{13}$ = 22.9750 | | |
| $r_{14}$ = −21.9840 | | |
| $d_{14}$ = 1.9000 | $n_8$ = 1.48749 | $v_8$ = 70.21 |
| $r_{15}$ = −136.2105 | | |
| aspherical surface coefficients | | |

P = 1, E = −0.3469 × $10^{-5}$, F = −0.53788 × $10^{-8}$,
G = 0.34127 × $10^{-11}$, H = −0.90336 × $10^{-14}$
(object distance 0.5 m)

$d_{11}$ = 2.221, $d_{13}$ = 22.138, $f_2/f$ = 0.743,
$f_1/f_2$ = 8.104, $\beta_3$ = 1.159, $f_b/f$ = 0.1398

Embodiment 6

| f = 50.500, | F/1.460, | $2\omega$ = 46.38° |
|---|---|---|
| $r_1$ = 62.4148 | (aspherical surface) | |
| $d_1$ = 1.8000 | $n_1$ = 1.56138 | $v_1$ = 45.18 |
| $r_2$ = 30.8130 | | |
| $d_2$ = 0.1000 | | |
| $r_3$ = 26.0954 | | |
| $d_3$ = 14.7864 | $n_2$ = 1.80440 | $v_2$ = 39.58 |
| $r_4$ = 26.8226 | (aspherical surface) | |
| $d_4$ = 1.8765 | | |
| $r_5$ = 41.4971 | | |
| $d_5$ = 1.8000 | $n_3$ = 1.80100 | $v_3$ = 34.97 |
| $r_6$ = 16.4341 | | |
| $d_6$ = 9.2949 | $n_4$ = 1.67790 | $v_4$ = 55.33 |
| $r_7$ = 2305.3043 | | |
| $d_7$ = 1.9980 | | |
| $r_8$ = ∞ (stop) | | |
| $d_8$ = 3.0729 | | |
| $r_9$ = −84.1437 | | |
| $d_9$ = 1.8000 | $n_5$ = 1.63636 | $v_5$ = 35.37 |
| $r_{10}$ = 26.4346 | | |
| $d_{10}$ = 6.2612 | $n_6$ = 1.77250 | $v_6$ = 49.60 |
| $r_{11}$ = −1371.2830 | | |
| $d_{11}$ = 0.1000 | | |
| $r_{12}$ = 79.4930 | | |
| $d_{12}$ = 6.0942 | $n_7$ = 1.78800 | $v_7$ = 47.38 |
| $r_{13}$ = −49.8061 | (aspherical surface) | |
| $d_{13}$ = 22.2158 | | |
| $r_{14}$ = −20.5542 | | |
| $d_{14}$ = 1.8000 | $n_8$ = 1.48749 | $v_8$ = 70.21 |
| $r_{15}$ = −106.7565 | | |
| aspherical surface coefficients | | |

(1st surface)   P = 1, E = −0.41318 × $10^{-5}$,
F = −0.27720 × $10^{-8}$, G = 0.46920 × $10^{-12}$,
H = −0.13163 × $10^{-14}$ (4th surface)   P = 1, E = −0.79524 × $10^{-6}$,
F = 0.12992 × $10^{-7}$, G = 0.50088 × $10^{-10}$,
H = 0.21119 × $10^{-12}$ (13th surface) $\quad$ P = 1, E = -0.68955 × 10$^{-6}$,
$\quad$ F = 0.35250 × 10$^{-8}$, G = -0.33959 × 10$^{-10}$,
$\quad$ H = 0.69315 × 10$^{-13}$
(object distance 0.5 m)

$d_{11}$ = 1.927, $d_{13}$ = 21.707, $f_2/f$ = 0.743,
$f_1/f_2$ = 8.104, $\beta_3$ = 1.163, $f_b/f$ = 0.14

Embodiment 7

| | | |
|---|---|---|
| f = 50.500, | F/1.460, | 2ω = 46.58° |
| $r_1$ = 44.3183 | (aspherical surface) | |
| $d_1$ = 1.9000 | $n_1$ = 1.53113 | $\nu_1$ = 62.44 |
| $r_2$ = 34.6036 | | |
| $d_2$ = 0.1000 | | |
| $r_3$ = 27.8357 | | |
| $d_3$ = 11.3587 | $n_2$ = 1.80518 | $\nu_2$ = 25.43 |
| $r_4$ = 24.3295 | | |
| $d_4$ = 2.2463 | | |
| $r_5$ = 39.4816 | | |
| $d_5$ = 1.9000 | $n_3$ = 1.80518 | $\nu_3$ = 25.43 |
| $r_6$ = 19.4051 | | |
| $d_6$ = 7.3596 | $n_4$ = 1.61800 | $\nu_4$ = 63.39 |
| $r_7$ = 159.7589 | | |
| $d_7$ = 2.5666 | | |
| $r_8$ = ∞ (stop) | | |
| $d_8$ = 3.3943 | | |
| $r_9$ = -70.1636 | | |
| $d_9$ = 1.9000 | $n_5$ = 1.59551 | $\nu_5$ = 39.21 |
| $r_{10}$ = 32.3298 | | |
| $d_{10}$ = 5.9685 | $n_6$ = 1.77250 | $\nu_6$ = 49.60 |
| $r_{11}$ = -231.1346 | | |
| $d_{11}$ = 0.1000 | | |
| $r_{12}$ = 78.2979 | | |
| $d_{12}$ = 9.0156 | $n_7$ = 1.77250 | $\nu_7$ = 49.60 |
| $r_{13}$ = -47.7298 | (aspherical surface) | |
| $d_{13}$ = 23.0405 | | |
| $r_{14}$ = -22.3576 | | |
| $d_{14}$ = 1.9000 | $n_8$ = 1.51728 | $\nu_8$ = 69.56 |
| $r_{15}$ = -125.0438 | | | aspherical surface coefficients (1st surface) $\quad$ P = 1, E = -0.32790 × 10$^{-5}$,
$\quad$ F = -0.52925 × 10$^{-8}$, G = 0.31167 × 10$^{-11}$,
$\quad$ H = -0.95978 × 10$^{-14}$
(13th surface) $\quad$ P = 1, E = 0.14228 ×10$^{-6}$,
$\quad$ F = 0.19143 × 10$^{-8}$, G = -0.13915 × 10$^{-10}$,
$\quad$ H = 0.26949 × 10$^{-13}$
(object distance 0.5 m)

$d_{11}$ = 2.147, $d_{13}$ = 22.266, $f_2/f$ = 0.757,
$f_1/f_2$ = 6.3980, $\beta_3$ = 1.162, $f_b/f$ = 0.14

Embodiment 8

| | | |
|---|---|---|
| f = 55.000, | F/0.982, | 2ω = 43.28° |
| $r_1$ = 43.7316 | | |
| $d_1$ = 10.9029 | $n_1$ = 1.77250 | $\nu_1$ = 49.60 |
| $r_2$ = 203.2469 | | |
| $d_2$ = 2.9986 | | |
| $r_3$ = 48.5830 | (aspherical surface) | |
| $d_3$ = 8.7861 | $n_2$ = 1.74077 | $\nu_2$ = 27.79 |
| $r_4$ = 23.9871 | | |
| $d_4$ = 10.7579 | | |
| $r_5$ = -104.8031 | | |
| $d_5$ = 2.4000 | $n_3$ = 1.60342 | $\nu_3$ = 38.01 |
| $r_6$ = 30.3023 | | |
| $d_6$ = 9.8000 | $n_4$ = 1.77250 | $\nu_4$ = 49.60 |
| $r_7$ = -299.2414 | | |
| $d_7$ = 1.5000 | | |
| $r_8$ = ∞ (stop) | | |
| $d_8$ = 4.1709 | | |
| $r_9$ = -79.2846 | | |
| $d_9$ = 2.4000 | $n_5$ = 1.65446 | $\nu_5$ = 33.62 |
| $r_{10}$ = 38.0304 | | |
| $d_{10}$ = 9.8360 | $n_6$ = 1.77250 | $\nu_6$ = 49.60 |
| $r_{11}$ = -90.4049 | | |
| $d_{11}$ = 0.5000 | | |
| $r_{12}$ = 46.7892 | | |
| $d_{12}$ = 7.3770 | $n_7$ = 1.77250 | $\nu_7$ = 49.60 |
| $r_{13}$ = -556.0820 | (aspherical surface) | |
| $d_{13}$ = 5.9994 | | |
| $r_{14}$ = 127.9066 | | |
| $d_{14}$ = 8.6543 | $n_8$ = 1.78800 | $\nu_8$ = 47.38 |
| $r_{15}$ = 22213.4110 | (aspherical surface) | |
| $d_{15}$ = 5.7342 | | |
| $r_{16}$ = -35.7596 | | |
| $d_{16}$ = 2.4000 | $n_9$ = 1.55690 | $\nu_9$ = 48.55 |
| $r_{17}$ = 679.5640 | | | aspherical surface coefficients (3rd surface) $\quad$ P = 1, E = -0.20307 × 10$^{-5}$,
$\quad$ F = -0.11829 × 10$^{-8}$, G = -0.17579 × 10$^{-11}$,
$\quad$ H = 0.96660 × 10$^{-15}$
(13th surface) $\quad$ P = 1, E = -0.40644 × 10$^{-5}$,
$\quad$ F = 0.11557 × 10$^{-8}$, G = 0.49239 × 10$^{-12}$,
$\quad$ H = 0.26701 × 10$^{-14}$
(15th surface) $\quad$ P = 1, E = 0.10679 × 10$^{-4}$,
$\quad$ F = -0.10148 × 10$^{-7}$, G = 0.55799 × 10$^{-10}$,
$\quad$ H = -0.58334 × 10$^{-13}$
(object distance 0.5 m)

$d_{11}$ = 4.526, $D_{13}$ = 6.223, $f_2/f$ = 0.817,
$f_1/f_2$ = 3.302, $\beta_3$ = 1.012, $f_b/f$ = 0.127

Embodiment 9

| | | |
|---|---|---|
| f = 54.999, | F/0.997, | 2ω = 42.74° |
| $r_1$ = 46.2573 | | |
| $d_1$ = 10.5212 | $n_1$ = 1.69680 | $\nu_1$ = 55.53 |
| $r_2$ = 368.1818 | | |
| $d_2$ = 0.1000 | | |
| $r_3$ = 60.4280 | (aspherical surface) | |
| $d_3$ = 9.0618 | $n_2$ = 1.84666 | $\nu_2$ = 23.88 |
| $r_4$ = -153.2042 | | |
| $d_4$ = 2.5652 | $n_3$ = 1.75084 | $\nu_3$ = 27.69 |
| $r_5$ = 26.2022 | | |
| $d_5$ = 8.4106 | | |
| $r_6$ = 437.3096 | | |
| $d_6$ = 5.7093 | $n_4$ = 1.78650 | $\nu_4$ = 50.00 |
| $r_7$ = -56.8526 | | |
| $d_7$ = 2.4000 | $n_5$ = 1.71736 | $\nu_5$ = 29.51 |
| $r_8$ = 177.6033 | | |
| $d_8$ = 2.9594 | | |
| $r_9$ = ∞ (stop) | | |
| $d_9$ = 4.3418 | | |
| $r_{10}$ = -75.3357 | | |
| $d_{10}$ = 2.4000 | $n_6$ = 1.65446 | $\nu_6$ = 33.62 |
| $r_{11}$ = 37.7862 | | |
| $d_{11}$ = 10.8944 | $n_7$ = 1.77250 | $\nu_7$ = 49.60 |
| $r_{12}$ = -77.6001 | | |
| $d_{12}$ = 0.1000 | | |
| $r_{13}$ = 55.9662 | | |
| $d_{13}$ = 7.3497 | $n_8$ = 1.77250 | $\nu_8$ = 49.60 |
| $r_{14}$ = -497.9182 | (aspherical surface) | |
| $d_{14}$ = 9.7991 | | |
| $r_{15}$ = 74.8443 | | |
| $d_{15}$ = 9.1592 | $n_9$ = 1.77250 | $\nu_9$ = 49.60 |
| $r_{16}$ = -1127.1015 | (aspherical surface) | |
| $d_{16}$ = 5.9744 | | |
| $r_{17}$ = -33.6884 | | |
| $d_{17}$ = 2.4000 | $n_{10}$ = 1.58921 | $\nu_{10}$ = 41.08 |
| $r_{18}$ = 456.6253 | | | aspherical surface coefficients (3rd surface) $\quad$ P = 1, E = -0.19205 × 10$^{-5}$,
$\quad$ F = -0.82092 × 10$^{-9}$,
$\quad$ G = -0.61230 × 10$^{-12}$,
$\quad$ H = 0.48248 × 10$^{-15}$
(14th surface) $\quad$ P = 1, E = -0.43635 × 10$^{-5}$,
$\quad$ F = 0.19076 × 10$^{-8}$, G = -0.31197 × 10$^{-11}$,
$\quad$ H = 0.52124 × 10$^{-14}$
(16th surface) $\quad$ P = 1, E = 0.76200 × 10$^{-5}$,
$\quad$ F = -0.32750 × 10$^{-8}$, G = 0.13957 × 10$^{-10}$,
$\quad$ H = 0.95406 × 10$^{-14}$
(object distance 0.5 m)

$d_{12}$ = 3.614, $d_{14}$ = 10.011, $f_2/f$ = 0.873,
$f_1/f_2$ = 4.394, $\beta_3$ = 0.927, $f_b/f$ = 0.1273

Embodiment 10

| | | |
|---|---|---|
| f = 55.000, | F/0.998, | 2ω = 42.68° |
| $r_1$ = 45.1179 | | |

-continued

| | | |
|---|---|---|
| $d_1 = 10.9176$ | $n_1 = 1.69680$ | $\nu_1 = 55.53$ |
| $r_2 = 301.9490$ | | |
| $d_2 = 0.1000$ | | |
| $r_3 = 56.3954$ | (aspherical surface) | |
| $d_3 = 8.8298$ | $n_2 = 1.84666$ | $\nu_2 = 23.88$ |
| $r_4 = -184.3264$ | | |
| $d_4 = 2.4000$ | $n_3 = 1.75520$ | $\nu_3 = 27.51$ |
| $r_5 = 25.1449$ | | |
| $d_5 = 10.5528$ | | |
| $r_6 = -112.2739$ | | |
| $d_6 = 2.4000$ | $n_4 = 1.66680$ | $\nu_4 = 33.04$ |
| $r_7 = 30.6778$ | | |
| $d_7 = 9.8000$ | $n_5 = 1.77250$ | $\nu_5 = 49.60$ |
| $r_8 = -265.6339$ | | |
| $d_8 = 1.2313$ | | |
| $r_9 = \infty$ (stop) | | |
| $d_9 = 3.9422$ | | |
| $r_{10} = -98.7282$ | | |
| $d_{10} = 2.4000$ | $n_6 = 1.65446$ | $\nu_6 = 33.62$ |
| $r_{11} = 50.5378$ | | |
| $d_{11} = 8.8278$ | $n_7 = 1.77250$ | $\nu_7 = 49.60$ |
| $r_{12} = -91.0692$ | | |
| $d_{12} = 0.1000$ | | |
| $r_{13} = 50.8728$ | | |
| $d_{13} = 6.8935$ | $n_8 = 1.77250$ | $\nu_8 = 49.60$ |
| $r_{14} = -1151.3130$ | (aspherical surface) | |
| $d_{14} = 9.7788$ | | |
| $r_{15} = 83.7471$ | | |
| $d_{15} = 7.8372$ | $n_9 = 1.77250$ | $\nu_9 = 49.60$ |
| $r_{16} = 1740.4237$ | (aspherical surface) | |
| $d_{16} = 6.0231$ | | |
| $r_{17} = -33.7780$ | | |
| $d_{17} = 2.4000$ | $n_{10} = 1.58921$ | $\nu_{10} = 41.08$ |
| $r_{18} = 1443.2031$ | | | aspherical surface coefficients (3rd surface) $P = 1$, $E = -0.18172 \times 10^{-5}$,
$F = -0.88412 \times 10^{-9}$, $G = -0.73022 \times 10^{-12}$,
$H = 0.42697 \times 10^{-15}$ (14th surface) $P = 1$, $E = -0.42488 \times 10^{-5}$,
$F = 0.17953 \times 10^{-8}$, $G = -0.38059 \times 10^{-11}$,
$H = 0.67781 \times 10^{-14}$ (16th surface) $P = 1$, $E = 0.84055 \times 10^{-5}$,
$F = -0.11207 \times 10^{-8}$, $G = 0.15575 \times 10^{-10}$,
$H = 0.18379 \times 10^{-13}$ (object distance 0.5 m)

$d_{12} = 3.645$, $d_{14} = 10.039$, $f_2/f = 0.876$,
$f_1/f_2 = 3.822$, $\beta_3 = 0.9684$, $f_b/f = 0.127$ Embodiment 11

| | | |
|---|---|---|
| $f = 55.000$, | F/0.997, | $2\omega = 41.88°$ |
| $r_1 = 57.3044$ | | |
| $d_1 = 7.6187$ | $n_1 = 1.69680$ | $\nu_1 = 55.53$ |
| $r_2 = 167.3430$ | | |
| $d_2 = 0.1000$ | | |
| $r_3 = 54.7680$ | (aspherical surface) | |
| $d_3 = 7.4012$ | $n_2 = 1.80518$ | $\nu_2 = 25.43$ |
| $r_4 = 282.1730$ | | |
| $d_4 = 0.3000$ | | |
| $r_5 = 177.7464$ | | |
| $d_5 = 2.6000$ | $n_3 = 1.66680$ | $\nu_3 = 33.04$ |
| $r_6 = 29.5115$ | | |
| $d_6 = 3.7900$ | | |
| $r_7 = 43.5557$ | | |
| $d_7 = 8.5932$ | $n_4 = 1.77250$ | $\nu_4 = 49.60$ |
| $r_8 = -680.9226$ | | |
| $d_8 = 2.6000$ | $n_5 = 1.71736$ | $\nu_5 = 29.51$ |
| $r_9 = 31.4802$ | | |
| $d_9 = 7.5627$ | | |
| $r_{10} = \infty$ (stop) | | |
| $d_{10} = 4.9384$ | | |
| $r_{11} = -55.2618$ | | |
| $d_{11} = 2.2028$ | $n_6 = 1.66680$ | $\nu_6 = 33.04$ |
| $r_{12} = 37.2189$ | | |
| $d_{12} = 12.1948$ | $n_7 = 1.77250$ | $\nu_7 = 49.60$ |
| $r_{13} = -58.2660$ | | |
| $d_{13} = 0.1000$ | | |
| $r_{14} = 50.1138$ | | |
| $d_{14} = 15.9262$ | $n_8 = 1.77250$ | $\nu_8 = 49.60$ |

-continued

| | | |
|---|---|---|
| $r_{15} = -100.1202$ | (aspherical surface) | |
| $d_{15} = 2.3273$ | | |
| $r_{16} = -430.8372$ | | |
| $d_{16} = 20.5787$ | $n_9 = 1.77250$ | $\nu_9 = 49.60$ |
| $r_{17} = -120.5135$ | (aspherical surface) | |
| $d_{17} = 4.0206$ | | |
| $r_{18} = -40.5468$ | | |
| $d_{18} = 2.6000$ | $n_{10} = 1.66680$ | $\nu_{10} = 33.04$ |
| $r_{19} = 383.8452$ | | | aspherical surface coefficient (3rd surface) $P = 1$, $E = -0.90893 \times 10^{-6}$,
$F = -0.72352 \times 10^{-9}$, $G = 0.15898 \times 10^{-12}$,
$H = -0.22640 \times 10^{-15}$ (15th surface) $P = 1$, $E = -0.17092 \times 10^{-5}$,
$F = -0.26621 \times 10^{-9}$, $G = 0.24384 \times 10^{-11}$,
$H = 0.23184 \times 10^{-15}$ (17th surface) $P = 1$, $E = 0.78445 \times 10^{-5}$,
$F = -0.18394 \times 10^{-8}$, $G = 0.16940 \times 10^{-10}$,
$H = 0.97284 \times 10^{-14}$ (object distance 0.5 m)

$d_{13} = 5.064$, $d_{15} = 2.350$, $f_2/f = 0.636$,
$f_1/f_2 = 8.823$, $\beta_3 = 1.115$, $f_b/f = 0.127$ Embodiment 12

| | | |
|---|---|---|
| $f = 55.598$, | F/1.450, | $2\omega = 42.82°$ |
| $r_1 = 37.8923$ | (aspherical surface) | |
| $d_1 = 13.4115$ | $n_1 = 1.80100$ | $\nu_1 = 34.97$ |
| $r_2 = 33.7638$ | | |
| $d_2 = 1.0069$ | | |
| $r_3 = 34.6422$ | (aspherical surface) | |
| $d_3 = 3.5918$ | $n_2 = 1.77250$ | $\nu_2 = 49.60$ |
| $r_4 = 55.5433$ | | |
| $d_4 = 3.6040$ | | |
| $r_5 = -186.6792$ | | |
| $d_5 = 2.2000$ | $n_3 = 1.65446$ | $\nu_3 = 33.62$ |
| $r_6 = 36.5777$ | | |
| $d_6 = 1.3487$ | | |
| $r_7 = 51.7512$ | | |
| $d_7 = 1.5000$ | $n_4 = 1.80349$ | $\nu_4 = 30.40$ |
| $r_8 = 25.4513$ | | |
| $d_8 = 9.1286$ | $n_5 = 1.74100$ | $\nu_5 = 52.65$ |
| $r_9 = -699.6302$ | | |
| $d_9 = 2.0349$ | | |
| $r_{10} = \infty$ (stop) | | |
| $d_{10} = 1.5375$ | | |
| $r_{11} = 57.2625$ | | |
| $d_{11} = 2.2000$ | $n_6 = 1.60562$ | $\nu_6 = 43.72$ |
| $r_{12} = 51.4242$ | | |
| $d_{12} = 8.2990$ | $n_7 = 1.78650$ | $\nu_7 = 50.00$ |
| $r_{13} = -53.5147$ | (aspherical surface) | |
| $d_{13} = 0.1000$ | | |
| $r_{14} = -89.5098$ | | |
| $d_{14} = 6.2876$ | $n_8 = 1.62045$ | $\nu_8 = 38.12$ |
| $r_{15} = 77.9014$ | | |
| $d_{15} = 2.4490$ | | |
| $r_{16} = 260.1861$ | | |
| $d_{16} = 4.6745$ | $n_9 = 1.77250$ | $\nu_9 = 49.60$ |
| $r_{17} = -83.4404$ | | |
| $d_{17} = 17.4151$ | | |
| $r_{18} = -23.1373$ | | |
| $d_{18} = 2.2000$ | $n_{10} = 1.48749$ | $\nu_{10} = 70.21$ |
| $r_{19} = -107.5731$ | | | aspherical surface coefficients (1st surface) $P = 1$, $E = 0.74450 \times 10^{-6}$,
$F = 0.15845 \times 10^{-8}$, $G = -0.20410 \times 10^{-11}$,
$H = 0.28871 \times 10^{-14}$ (3rd surface) $P = 1$, $E = -0.48613 \times 10^{-5}$,
$F = -0.10716 \times 10^{-7}$, $G = 0.79582 \times 10^{-11}$,
$H = -0.28519 \times 10^{-13}$ (13th surface) $P = 1$, $E = -0.27516 \times 10^{-6}$,
$F = -0.79712 \times 10^{-9}$, $G = -0.50797 \times 10^{-11}$,
$H = 0.98257 \times 10^{-14}$ (object distance 0.5 m)

$d_{13} = 0.100$, $d_{15} = 5.288$, $f_2/f = 0.752$,
$f_1/f_2 = 7.152$, $\beta_3 = 1.146$, $f_b/f = 0.126$ -continued

Embodiment 13

| | | |
|---|---|---|
| f = 60.000, | F/1.088, | $2\omega = 39.38°$ |
| $r_1 = 59.1841$ | | |
| $d_1 = 13.1942$ | $n_1 = 1.69680$ | $\nu_1 = 55.53$ |
| $r_2 = 205.1956$ | | |
| $d_2 = 0.1000$ | | |
| $r_3 = 59.2225$ | (aspherical surface) | |
| $d_3 = 6.6990$ | $n_2 = 1.80518$ | $\nu_2 = 25.43$ |
| $r_4 = 321.1775$ | | |
| $d_4 = 0.3000$ | | |
| $r_5 = 235.9322$ | | |
| $d_5 = 2.5000$ | $n_3 = 1.66680$ | $\nu_3 = 33.04$ |
| $r_6 = 30.7841$ | | |
| $d_6 = 3.5294$ | | |
| $r_7 = 46.8064$ | | |
| $d_7 = 9.4561$ | $n_4 = 1.77250$ | $\nu_4 = 49.60$ |
| $r_8 = 8767.7449$ | | |
| $d_8 = 3.6070$ | $n_5 = 1.71736$ | $\nu_5 = 29.51$ |
| $r_9 = 33.0015$ | | |
| $d_9 = 9.9244$ | | |
| $r_{10} = \infty$ (stop) | | |
| $d_{10} = 4.5111$ | | |
| $r_{11} = -58.6462$ | | |
| $d_{11} = 2.2028$ | $n_6 = 1.66680$ | $\nu_6 = 33.04$ |
| $r_{12} = 40.4172$ | | |
| $d_{12} = 10.3131$ | $n_7 = 1.77250$ | $\nu_7 = 49.60$ |
| $r_{13} = -59.4413$ | | |
| $d_{13} = 2.0283$ | | |
| $r_{14} = 53.6221$ | | |
| $d_{14} = 15.8144$ | $n_8 = 1.77250$ | $\nu_8 = 49.60$ |
| $r_{15} = -103.9741$ | (aspherical surface) | |
| $d_{15} = 3.2433$ | | |
| $r_{16} = -1219.5299$ | | |
| $d_{16} = 20.5787$ | $n_9 = 1.77250$ | $\nu_9 = 49.60$ |
| $r_{17} = -143.9310$ | (aspherical surface) | |
| $d_{17} = 4.1892$ | | |
| $r_{18} = -40.4277$ | | |
| $d_{18} = 2.5000$ | $n_{10} = 1.66680$ | $\nu_{10} = 33.04$ |
| $r_{19} = 550.9271$ | | | aspherical surface coefficients (3rd surface)    $P = 1, E = -0.85225 \times 10^{-6}$,
$F = -0.56760 \times 10^{-9}, G = 0.14992 \times 10^{-12}$,
$H = -0.16259 \times 10^{-15}$ (15th surface)    $P = 1, E = -0.17723 \times 10^{-5}$,
$F = 0.82692 \times 10^{-10}, G = 0.23793 \times 10^{-11}$,
$H = -0.83789 \times 10^{-15}$ (17th surface)    $P = 1, E = 0.68896 \times 10^{-5}$,
$F = -0.39892 \times 10^{-9}, G = 0.93290 \times 10^{-11}$,
$H = 0.91916 \times 10^{-14}$ (object distance 0.5 m)

$d_{13} = 7.596, d_{14} = 3.278, f_2/f = 0.621$,
$f_1/f_2 = 9.6174, \beta_3 = 1.094, f_b/f = 0.117$ The fifth embodiment has a composition illustrated in FIGS. 6A and 6B, FIG. 6A showing a composition of the embodiment when it is focused on infinite object distance, whereas FIG. 6B showing a composition when it is focused on a finite object distance (0.5 m).

The fifth embodiment is configured as a standard lens system which has a focal length of 50.5 mm, an aperture ratio of 1:1.46 and a field angle of 46.72°. In this embodiment, a first lens unit has a focal length of 304.083 mm, a second lens unit has a focal length of 37.521 mm and a third lens unit has a focal length of −54.07 mm.

The fifth embodiment is composed of the first lens unit G1, which consists of a negative meniscus lens component disposed on the image side and having a convex surface on the object side, a positive meniscus lens component having a convex surface on the object side, and a cemented doublet consisting of a negative meniscus lens element and a positive meniscus lens element; an aperture stop; the second lens unit G2 which is composed of a cemented doublet consisting of a biconcave lens element and a biconvex lens element, and a biconvex lens component; and the third lens unit G3, which is composed of a negative meniscus lens component having a convex surface on the image side.

The fifth embodiment is focused by moving two sub-units G2A and G2B separately, and varying an airspace reserved between the second lens unit and the third lens unit. For focusing the lens system from infinite object distance onto an object distance of 0.5 m, an airspace reserved between the subunits G2A and G2B in the second lens unit G2 is varied for a distance of +2.121 mm. An airspace reserved between the second lens unit and the third lens unit is varied for a distance of −0.837 mm.

The fifth embodiment has a nearly symmetrical refractive power arrangement and favorably corrects distortion, lateral chromatic aberration and so on which pose problems in the lens system for single-lens reflex cameras. The fifth embodiment also corrects spherical aberration and astigmatism favorably. An aspherical surface is used as an object side surface of the first lens unit.

Figure 7:
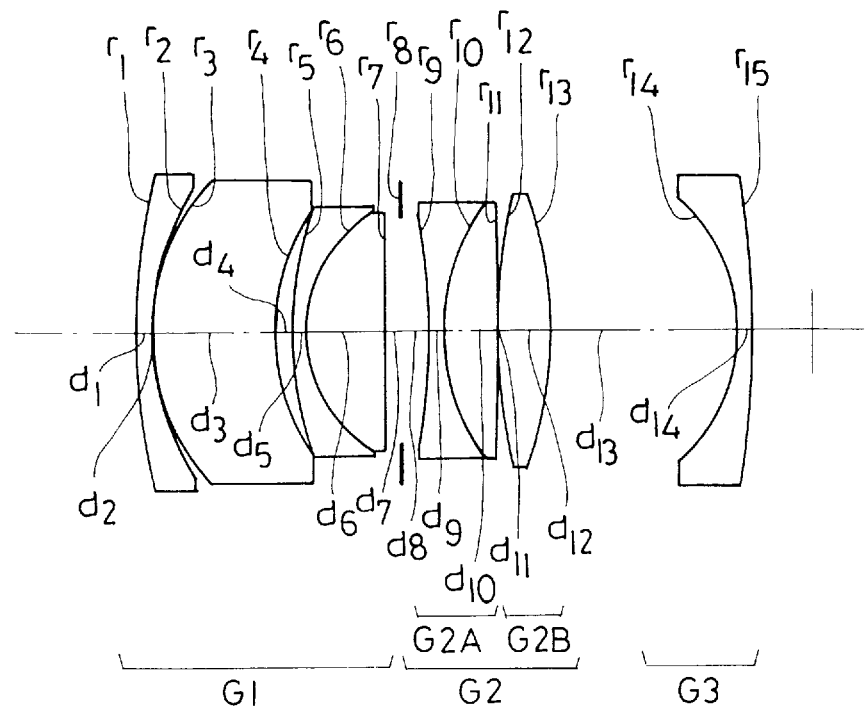
FIGS. 7 through 14 show sectional views illustrating compositions of sixth through thirteenth embodiments of the present invention.

The sixth embodiment has a composition illustrated in FIG. 7 which is the same as that of the fifth embodiment, except for locations at which aspherical surfaces are disposed.

The sixth embodiment is configured as a standard lens system which has a focal length of 50.5 mm, an aperture ratio of 1:1.46 and a field angle of 46.38°, and uses a first lens unit having a focal length of 304.083 mm, a second lens unit having a focal length of 37.521 mm and a third lens unit having a focal length of −54.07 mm.

Different from the fifth embodiment, the sixth embodiment uses an aspherical surface as a concave surface of a positive meniscus lens component disposed in the first lens unit for facilitating correction of sagittal coma, and another aspherical surface as an image side surface of a biconvex lens component disposed in the second lens unit for effective correction of spherical aberration and meridional coma. Further, spherical aberration is corrected also by an aspherical surface used as the first surface of the sixth embodiment.

Variations of aberrations caused by focusing the lens system on an object located at a short distance are corrected by varying an airspace $d_{11}$ reserved between subunits G2A and G2B disposed in the second lens unit, and another airspace $d_{13}$ reserved between the second lens unit and the third lens unit. These airspaces are varied for distances of +1.827 mm and −0.509 mm respectively.

The sixth embodiment is a lens system in which the aspherical surfaces exhibit their effects remarkably and variations of aberrations due to focusing are sufficiently suppressed.

Figure 8:
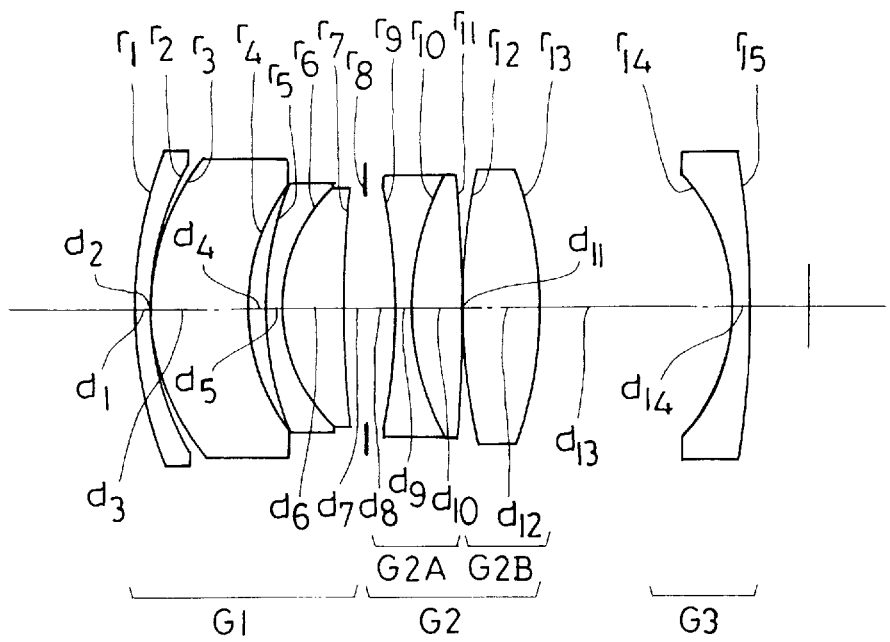

The seventh embodiment has a composition illustrated in FIG. 8 and is different from the sixth embodiment in that it uses an aspherical surface as a concave surface of a positive meniscus lens component disposed in a first lens unit.

The seventh embodiment is a standard lens system which has a focal length of 50.5 mm, an aperture ratio of 1:1.46 and a field angle of 47.58°. The first lens unit has a focal length of 244.599 mm, whereas a second lens unit has a focal length of 38.228 mm and a third lens unit has a focal length of −52.966 mm.

The eighth embodiment has a composition illustrated in FIG. 9, or is configured as a standard lens system which has a focal length of 55 mm, an aperture ratio as high as 1:0.982 and a field angle of 42.94°. A first lens unit has a focal length of 148.48 mm, a second lens unit has a focal length of 44.96 mm and a third lens unit has a focal length of −108.55 mm. The composition of the eighth embodiment is characterized in that the first lens unit is composed, in order from the object side, of a positive meniscus lens component having a convex surface on the object side, a negative meniscus lens component having a convex surface on the object side, and a cemented doublet consisting of a biconcave lens element and a positive lens element.

In the eighth embodiment, spherical aberration and sagittal coma are corrected effectively by using an aspherical surface, as described above, as an object side surface of the positive meniscus lens component having the convex surface on the object side disposed in the first lens unit.

A second lens unit is composed, in order from the object side, of a cemented doublet consisting of a negative biconcave lens element and a biconvex lens element, and a biconvex lens component like the second lens unit used in each of the sixth through eighth embodiments.

Since it is necessary to enhance relative luminance as a lens system has a higher aperture ratio a third lens unit is composed of a positive lens component and a negative lens component for overcoming the difficulty in correction of offaxial aberrations or making it possible to delicately correct an image surface. Further, an aspherical surface is used as an image side surface of the positive lens component for enhancing correcting capability.

In the eighth embodiment, which has an aperture ratio as high as 1:1, variations of aberrations are extremely stabilized between infinite distance and a finite distance. For focusing the eighth embodiment from infinite distance to an object distance of 0.5 m, an airspace reserved between subunits in the second lens unit, and another airspace reserved between the second lens unit and the third lens unit are varied for distances of +4.026 mm and +0.224 mm respectively. The first lens unit has a focal length of 210.907 mm, the second lens unit has a focal length of 48.004 mm and the third lens unit has a focal length of −179.012 mm.

Figure 10:
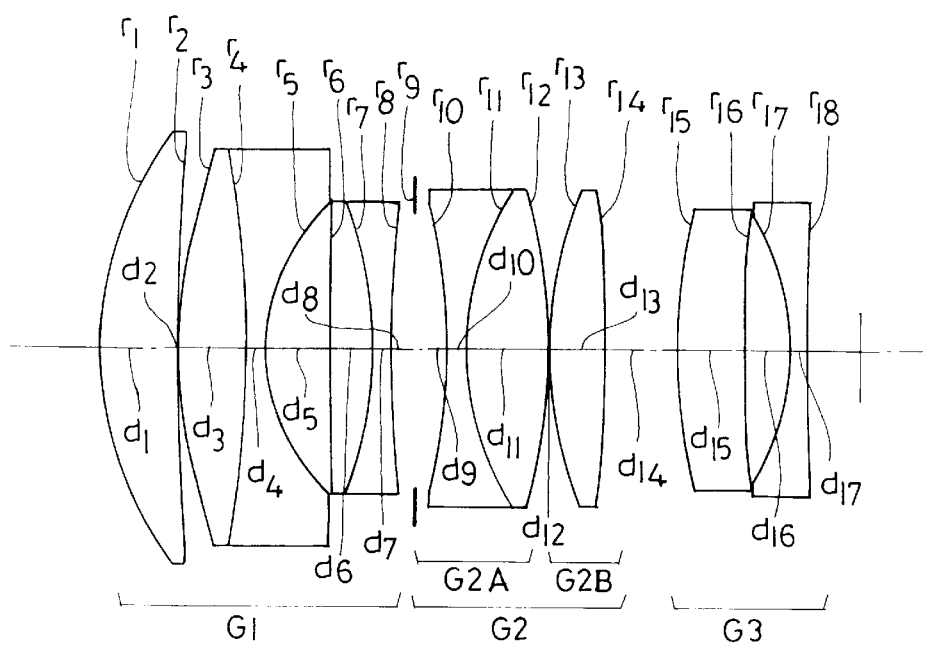

The ninth embodiment has a composition illustrated in FIG. 10, or is configured as a standard lens system which has a focal length of 55 mm, an aperture ratio of 1:0.998 and a field angle of 42.94°. The ninth embodiment has a basic composition which is the same as that of the eighth embodiment, but is characterized in a composition of a first lens unit. Speaking concretely, the first lens unit comprises a second negative meniscus lens component which is configured as a cemented doublet consisting of a biconvex lens element and a biconcave lens element, and a third lens component which is configured as a cemented doublet consisting of a biconvex lens element and a biconcave lens element. Other lens units of the ninth embodiment are basically the same as those of the eighth embodiment and use aspherical surfaces at the similar locations.

Figure 11:
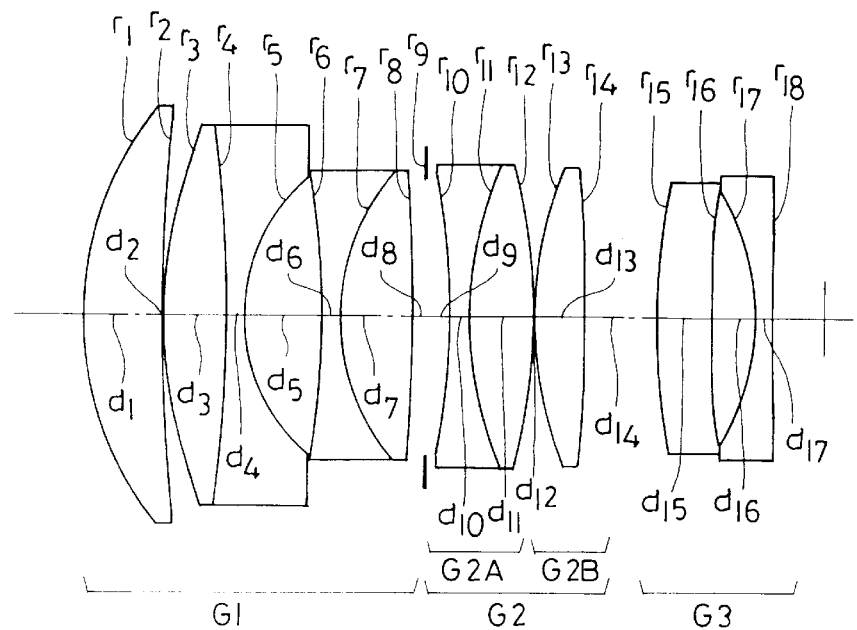

The tenth embodiment has a composition shown in FIG. 11, which is similar to that of the ninth embodiment. However, the tenth embodiment selects glass materials in different ways, adopts a modified paraxial refractive power arrangement and uses lens units having slightly stronger refractive powers, a first lens unit having a focal length of 184.129 mm, a second lens unit having a focal length of 48.170 mm, and a third lens unit having a focal length of −135.435 mm.

Figure 12:
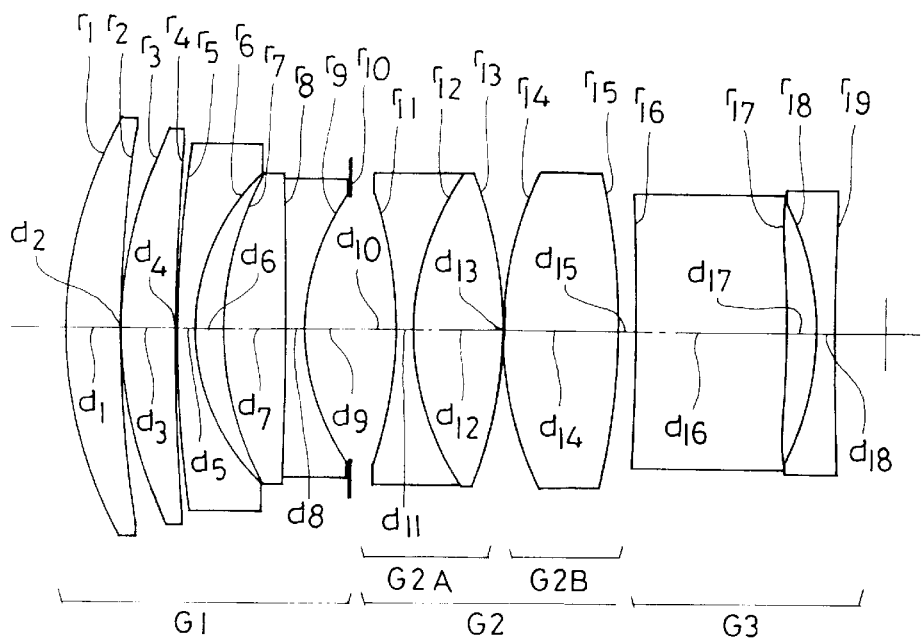

The eleventh embodiment has a composition illustrated in FIG. 12, or is configured as a standard lens system which has a focal length of 55 mm, an aperture ratio as high as 1:0.998 and a field angle of 42.94°. The first lens unit has a focal length of 308.856 mm, the second lens unit has a focal length of 35.006 mm and the third lens unit has a focal length of −74.102 mm.

Different from the tenth embodiment, the eleventh embodiment has the composition wherein a second lens component (cemented lens component) is divided into two lens components so as to form an air lens therebetween. Further, each of a second lens unit and a third lens unit comprises a lens component having large thickness d for correcting an image surface. For focusing the eleventh embodiment from infinite object distance to an object distance of 0.5 m, an airspace reserved in the second lens unit is varied for a distance of +4.964 mm, whereas an airspace reserved between the second lens unit and the third lens unit is varied for a distance of +0.023 mm. Since these variations are extremely small, the lens components and the lens units may be kept stationary.

Figure 13:
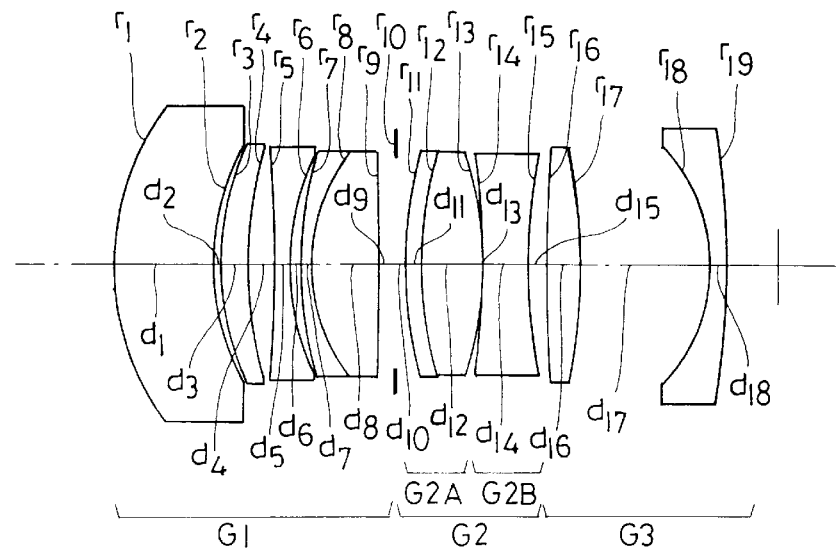

The twelfth embodiment has a composition shown in FIG. 13, or is configured as a standard lens system which has a focal length of 55 mm, an aperture ratio as high as 1:0.998 and a field angle of 42.94°. A first lens unit has a focal length of 299.028 mm, a second lens unit has a focal length of 41.808 mm and a third lens unit has a focal length of −60.989 mm. As seen from FIG. 13, the twelfth embodiment has the composition which is not of the modified Gauss type. The first lens unit is composed of two positive meniscus lens components having convex surfaces on the object side, a biconcave lens component, and a cemented doublet consisting of a negative meniscus lens element and a positive lens element. Used on the first and second meniscus lens components are aspherical surfaces for effectively correcting spherical aberration. The second lens unit is composed, in order from the object side, of a cemented doublet consisting of a negative lens element and a positive biconvex lens element, and a negative biconcave lens component. The cemented doublet has an image side surface which is configured as an aspherical surface. The third lens unit is composed of a positive biconvex lens component and a negative meniscus lens component having a convex surface on the image side which are disposed with an airspace reserved therebetween for correcting an image surface.

During focusing of the twelfth embodiment, only an airspace reserved between the second lens unit and the third lens unit is varied for correcting variations of aberrations.

Figure 14:
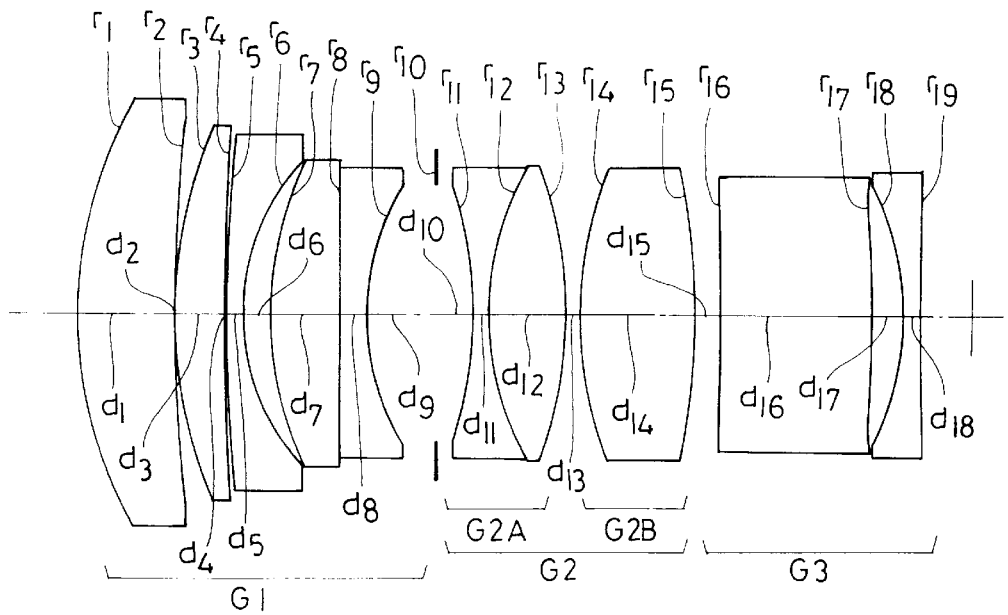

The thirteenth embodiment has a composition shown in FIG. 14, or is configured as a standard lens system which has a focal length of 60 mm, an aperture ratio as high as 1:1.088 and a field angle of 39.66°. A first lens unit has a focal length of 358.446 mm, a second lens unit has a focal length of 37.271 mm and a third lens unit has a focal length of −78.568 mm. The thirteenth embodiment has the composition which is similar to that of the eleventh embodiment and uses an aspherical surface as an object side surface of a second positive lens component of the first lens unit for correcting spherical aberration. Further, another aspherical surface is used as an image side surface of a positive biconvex lens component of the second lens unit for balancing coma. The third lens unit has a composition which is similar to that of the third lens unit adopted for each of the other embodiments.

For focusing the thirteenth embodiment, an airspace reserved in the second lens unit is varied for a distance of +5.568 mm, and another airspace reserved between the second lens unit and the third lens unit is varied for an extremely short distance. Though the second lens unit and the third lens unit can be kept stationary, the variation of the airspace between the lens units is effective for correcting variations of aberrations since it enables delicate correction of the variations.

The aspherical surfaces which are used in the embodiments described above have shapes expressed by the formula shown below:

$$x = \frac{y^2/r}{1 + \sqrt{1 - P(y/r)^2}} + Ey^4 + Fy^6 + Gy^8 + Hy^{10} + \ldots$$

wherein a direction along an optical axis is taken as the x axis, a direction perpendicular to the optical axis is taken as the y axis, the reference symbol r represents a radius of curvature on a reference sphere of an aspherical surface of interest, the reference symbol P designates a conical constant, and the reference symbols E, F, . . . denote aspherical surface coefficients of the fourth, sixth, . . . orders respectively.

The lens system according to the present invention, which is composed, in order from the object side, of a first lens unit having a positive refractive power, an aperture stop, a second lens unit having a positive refractive power and a third lens unit having a negative refractive power so as to have a symmetrical refractive power arrangement, has capabilities for sufficient correction of distortion which is conventionally considered impossible, correction of sagittal coma and facilitated correction of curvature of field. This lens system is usable as an ordinary photographic lens system covering the entire visible region or a standard lens system which has a large aperture and exhibits sufficient optical performance with an aperture stop open. Further, the lens system has high depicting performance and stability within a wide focusing range from infinite object distance to a finite object distance.

We claim:

1. A standard lens system comprising in order from the object side: a first lens unit having a positive refractive power; an aperture stop; a second lens unit having a positive refractive power; and a third lens unit having a negative refractive power, wherein said first lens unit is composed of a positive meniscus lens component which has a convex surface on the object side, and at least one doublet which consists of a positive lens component and a negative lens component, wherein said second lens unit is composed of a cemented doublet which consists of a negative lens element and a positive lens element, and a positive lens component, wherein said third lens unit is composed of at least one positive lens component and a negative lens component, and wherein said lens system satisfies the following conditions (1), (2), (3) and (4):

(1) $2.0 < f_1/f < 10$
(2) $1.0 < f_1/f_2 < 8$
(3) $0.8 < \beta_3 < 1.3$
(4) $0.1 < f_b/f < 0.5$ wherein the reference symbol $f_1$ represents a focal length of said first lens unit, the reference symbol $f_2$ designates a focal length of said second lens unit, the reference symbol f denotes a focal length of said standard lens system as a whole, the reference symbol $\beta_3$ represents an imaging magnification of said third lens unit for infinite object distance and the reference symbol $f_b$ designates a back focal length of said standard lens system as a whole.

2. A standard lens system comprising in order from the object side: a first lens unit having a positive refractive power; an aperture stop; a second lens unit having a positive refractive power; and a third lens unit having a negative refractive power, wherein said first lens unit is composed of at least one positive meniscus lens component which has a convex surface on the object side, and a doublet which consists of a positive lens element and a negative lens element, wherein said second lens unit is composed of at least one cemented doublet which consists of a negative lens element and a positive lens element, and a positive lens component, wherein said third lens unit is composed of at least one positive lens component and a negative lens component, and wherein said lens system is focused from infinite object distance onto a finite object distance by moving said first lens unit, said second lens unit and said third lens unit toward the object side from their locations for focusing on infinite object distance while varying at least one of airspaces reserved in said second lens unit and said third lens unit.

3. A standard lens system according to claim 2 satisfying the following conditions (1), (2), (3) and (4):

(1) $2.0 < f_1/f < 10$
(2) $1.0 < f_1/f_2 < 8$
(3) $0.8 < \beta_3 < 1.3$
(4) $0.1 < f_b/f < 0.5$ wherein the reference symbol $f_1$ represents a focal length of said first lens unit, the reference symbol $f_2$ designates a focal length of said second lens unit, the reference symbol f denotes a focal length of said standard lens system as a whole, the reference symbol $\beta_3$ represents an imaging magnification of said third lens unit when said standard lens system is focused on infinite object distance and the reference symbol $f_b$ designates a back focal length of said standard lens system as a whole.

4. A standard lens system according to claim 2 or 3 wherein an airspace reserved between said positive lens component and said negative lens component disposed in said third lens unit is varied during focusing of said lens system.

5. A standard lens system according to claim 2 or 3 wherein an airspace reserved between said cemented doublet and said positive lens component disposed in said second lens unit, and another airspace reserved between said positive lens component and said negative lens component disposed in said third lens unit are varied during focusing of said lens system.

6. A standard lens system comprising in order from the object side: a first lens unit having a positive refractive power; an aperture stop; a second lens unit having a positive refractive power; and a third lens unit having a negative refractive power, wherein said first lens unit is composed of at least one positive meniscus lens component which has a convex surface on the object side, and at least one doublet which consists of a positive lens component and a negative lens component, wherein said second lens unit is composed of at least one cemented doublet which consists of a negative lens element and a positive lens element, and a positive lens component, wherein said third lens unit is composed of at least one negative lens component, wherein said standard lens system comprises at least one aspherical surface disposed in any one of said first, second and third lens units, and wherein said standard lens system satisfies the following conditions (5), (6), (7) and (8):

(5) $0.5 < f_2/f < 10$
(6) $1.0 < f_1/f_2 < 15$
(7) $0.8 < \beta_3 < 1.3$
(8) $0.05 < f_b/f < 0.5$ wherein the reference symbol $f_1$ represents a focal length of said first lens unit, the reference symbol $f_2$ designates a focal length of said second lens unit, the reference symbol f denotes a focal length of said standard lens system as a whole, the reference symbol $\beta_3$ represents an imaging magnification of said third lens unit and the reference symbol $f_b$ designates a back focal length of said standard lens system as a whole.

7. A standard lens system comprising in order from the object side: a first lens unit having a positive refractive power; an aperture stop; a second lens unit having a positive refractive power; and a third lens unit having a negative refractive power, wherein said first lens unit is composed of at least one positive meniscus lens component which has a convex surface on the object side, and at least one doublet which consists of a positive lens component and a negative lens component, wherein said second lens unit is composed of a cemented doublet which consists of a negative lens element and a positive lens element, and a positive lens component, wherein said third lens unit is composed of at least one negative lens component, wherein said standard lens system comprises at least one aspherical surface in any one of said first, second and third lens unit, and wherein said standard lens system is focused from infinite object distance onto a finite object distance by moving said first lens unit, said second lens unit and said third lens unit toward the object side from their locations for infinite object distance while varying at least one of airspaces reserved in said second lens unit and said third lens unit.

8. A standard lens system according to claim 7 satisfying the following conditions (5), (6), (7) and (8):

(5) $0.5 < f_2/f < 10$ (6) $1.0 < f_1/f_2 < 15$ (7) $0.8 < \beta_3 < 1.3$ (8) $0.05 < f_b/f < 0.5$ wherein the reference symbol $f_1$ represents a focal length of said first lens unit, the reference symbol $f_2$ designates a focal length of said second lens unit, the reference symbol f denotes a focal length of said standard lens system as a whole, the reference symbol $\beta_3$ represents an imaging magnification of said third lens unit when said standard lens system is focused on infinite object distance and the reference symbol $f_b$ designates a back focal length of said standard lens system as a whole.

9. A standard lens system according to claim 2, 3, 7 or 8 wherein an airspace reserved between said cemented doublet and said positive lens component disposed in said second lens unit is varied during focusing said standard lens system.

* * * * *